US012772091B2

(12) United States Patent
Merlin et al.

(10) Patent No.: US 12,772,091 B2
(45) Date of Patent: Oct. 20, 2026

(54) SENSING SERVICE ADAPTIVE RECONFIGURATION

(71) Applicant: QUALCOMM Incorporated, San Diego, CA (US)

(72) Inventors: Simone Merlin, San Diego, CA (US); Olufunmilola Omolade Awoniyi-Oteri, San Diego, CA (US); Gavin Bernard Horn, La Jolla, CA (US); Punyaslok Purkayastha, San Diego, CA (US); Hong Cheng, Basking Ridge, NJ (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/535,582

(22) Filed: Dec. 11, 2023

(65) Prior Publication Data

US 2025/0193719 A1 Jun. 12, 2025

(51) Int. Cl.
*H04W 24/10* (2009.01)
*H04W 28/02* (2009.01)

(52) U.S. Cl.
CPC ....... *H04W 24/10* (2013.01); *H04W 28/0226* (2013.01)

(58) Field of Classification Search
CPC .......................... H04W 24/10; H04W 28/0226
See application file for complete search history.

(56) References Cited

U.S. PATENT DOCUMENTS 10,311,705 B1 * 6/2019 Aljuaid .............. G05B 19/0428
2023/0086144 A1 * 3/2023 Roy ........................ G01S 7/006 370/329

(Continued)

FOREIGN PATENT DOCUMENTS

WO 2019190832 A1 10/2019
WO 2021178941 A1 9/2021
WO 2023129791 A1 7/2023

OTHER PUBLICATIONS

3GPP: "3rd Generation Partnership Project, Technical Specification Group TSG SA, Feasibility Study on Integrated Sensing and Communication (Release 19)", 3GPP Standard, Technical Report, 3GPP TR 22.837, 3rd Generation Partnership Project, Mobile Competence Centre, 650, Route Des Lucioles, F-06921 Sophia-Antipolis Cedex, France, No. V2.0.0, Jun. 7, 2023, pp. 1-96, XP052408871, paragraph 3.1 paragraph 5.8.3.

(Continued)

*Primary Examiner* — Angela Widhalm De Rodriguez
(74) *Attorney, Agent, or Firm* — Harrity & Harrity, LLP

(57) ABSTRACT

Various aspects of the present disclosure generally relate to wireless communication. Some aspects more specifically relate to adaptive reconfiguration a sensing unit (SU) associated with a sensing service. Some aspects more specifically relate to adaptively configuring or reconfiguring sensing configurations for an SU based on, responsive to, or otherwise associated with detecting an event. In some aspects, the event may be based on, responsive to, or otherwise associated with wireless communication channel characteristics (for example, radio frequency (RF) signal propagation conditions) or a position of an SU, among other examples. For example, an SU, a network node, or a network function entity may detect an event that satisfies one or more criteria. For example, the SU may switch a sensing state based on, responsive to, or otherwise associated with the detection of an event.

30 Claims, 13 Drawing Sheets

(56) References Cited

U.S. PATENT DOCUMENTS

| | | | | |
|---|---|---|---|---|
| 2023/0370820 | A1 | 11/2023 | Cheng et al. | |
| 2024/0426972 | A1* | 12/2024 | Duan | G01S 13/66 |
| 2025/0093487 | A1* | 3/2025 | Walker | G01S 13/003 |

OTHER PUBLICATIONS

International Search Report and Written Opinion—PCT/US2024/055927—ISA/EPO—Feb. 25, 2025.

* cited by examiner

SENSING SERVICE ADAPTIVE RECONFIGURATION

FIELD OF THE DISCLOSURE

Aspects of the present disclosure generally relate to wireless communication and specifically relate to techniques, apparatuses, and methods associated with adaptive reconfiguration of sensing units associated with a sensing service.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

In some examples, a wireless communication network may support a sensing service, such as an integrated sensing and communication (ISAC) service. ISAC provides sensing capabilities (for example, RF sensing capabilities) using the same system and infrastructure that is used for wireless communication. One or more devices (which may be referred to as sensing units (SUs)) in the wireless communication network may perform RF sensing via resources of the wireless communication network (for example, using one or more RF signals). RF sensing enables wireless communication devices to acquire information about characteristics of the environment and/or objects within the environment. In some examples, RF sensing can be used to determine distances (ranges), angles, and/or instantaneous linear velocities, among other examples, of objects.

The sensing service may be associated with one or more SUs that are configured to perform RF sensing to fulfill one or more sensing requests. In a given wireless communication network, a variety of different devices may be capable of serving as an SU. However, different devices may be associated with different capabilities, different locations, and/or different guidelines for when the device can be configured to perform RF sensing. For example, a user equipment (UE) may be associated with different RF sensing capabilities than a network node. Additionally, introducing RF sensing as an ISAC service introduces additional considerations for configuring a given device as an SU. For example, network load information, link quality, and/or availability of wireless communication resources, among other examples, may impact configuration decisions for SUs in the wireless communication network. Further, when RF sensing technology is introduced as a new system capability, new considerations on authorization for service access and operation access, data confidentiality, data integrity, and/or user privacy are needed, to ensure that these aspects are taken into account when deriving sensing service requirements.

As a result, discovery and configuration for SUs within a wireless communication network may be a complex task requiring the coordination of several different network entities and/or network nodes. Currently, no procedures or protocols are defined for the discovery and configuration for SUs, which may result in one or more SUs failing to be registered or identified (for example, and therefore not participating in the sensing service provided by the wireless communication network). Additionally, this may result in one or more SUs being configured to perform sensing operations that the SU(s) are not capable of performing. For example, a wireless communication network may not currently support coordinating RF sensing among multiple network nodes and/or UEs, obtaining RF sensing capabilities from multiple network nodes and/or UEs, coordinating configuration and authorization for performing RF sensing by multiple network nodes and/or UEs, and/or providing a mechanism to provide RF sensing capable devices with information indicative of which network entity or network function SUs are to transmit sensing data to, among other examples.

SUMMARY

Some aspects described herein relate to a sensing unit (SU) for wireless communication. The SU may include a processing system that includes one or more processors and one or more memories coupled with the one or more processors. The processing system may be configured to cause the SU to perform, in accordance with operating according to a first sensing state, a first set of one or more operations associated with a sensing service. The processing system may be configured to cause the SU to obtain, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service. The processing system may be configured to cause the SU to perform, in accordance with operating according to the second sensing state, a second set of one or more operations associated with the sensing service.

Some aspects described herein relate to a sensing management function entity for wireless communication. The sensing management function entity may include a processing system that includes one or more processors and one or more memories coupled with the one or more processors. The processing system may be configured to cause the sensing management function entity to receive information for an SU associated with a sensing service, the information being indicative of whether an event satisfies one or more criteria. The processing system may be configured to cause the sensing management function entity to transmit, to the SU and in association with the information indicating that the event satisfies the one or more criteria, an indication to modify at least one of a sensing state or a sensing configuration of the SU.

Some aspects described herein relate to a method of wireless communication by an SU. The method may include performing, in accordance with operating according to a first sensing state, a first set of one or more operations associated with a sensing service. The method may include obtaining, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service. The method may include performing, in accordance with operating according to the second sensing state, a second set of one or more operations associated with the sensing service.

Some aspects described herein relate to a method of wireless communication by a sensing management function entity. The method may include receiving information for an SU associated with a sensing service, the information being indicative of whether an event satisfies one or more criteria. The method may include transmitting, to the SU and in association with the information indicating that the event satisfies the one or more criteria, an indication to modify at least one of a sensing state or a sensing configuration of the SU.

Some aspects described herein relate to a non-transitory computer-readable medium that stores a set of instructions for wireless communication by an SU. The set of instructions, when executed by one or more processors of the SU, may cause the SU to perform, in accordance with operating according to a first sensing state, a first set of one or more operations associated with a sensing service. The set of instructions, when executed by one or more processors of the SU, may cause the SU to obtain, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service. The set of instructions, when executed by one or more processors of the SU, may cause the SU to perform, in accordance with operating according to the second sensing state, a second set of one or more operations associated with the sensing service.

Some aspects described herein relate to a non-transitory computer-readable medium that stores a set of instructions for wireless communication by a sensing management function entity. The set of instructions, when executed by one or more processors of the sensing management function entity, may cause the sensing management function entity to receive information for an SU associated with a sensing service, the information being indicative of whether an event satisfies one or more criteria. The set of instructions, when executed by one or more processors of the sensing management function entity, may cause the sensing management function entity to transmit, to the SU and in association with the information indicating that the event satisfies the one or more criteria, an indication to modify at least one of a sensing state or a sensing configuration of the SU.

Some aspects described herein relate to an apparatus for wireless communication. The apparatus may include means for performing, in accordance with operating according to a first sensing state, a first set of one or more operations associated with a sensing service. The apparatus may include means for obtaining, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service. The apparatus may include means for performing, in accordance with operating according to the second sensing state, a second set of one or more operations associated with the sensing service.

Some aspects described herein relate to an apparatus for wireless communication. The apparatus may include means for receiving information for an SU associated with a sensing service, the information being indicative of whether an event satisfies one or more criteria. The apparatus may include means for transmitting, to the SU and in association with the information indicating that the event satisfies the one or more criteria, an indication to modify at least one of a sensing state or a sensing configuration of the SU.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
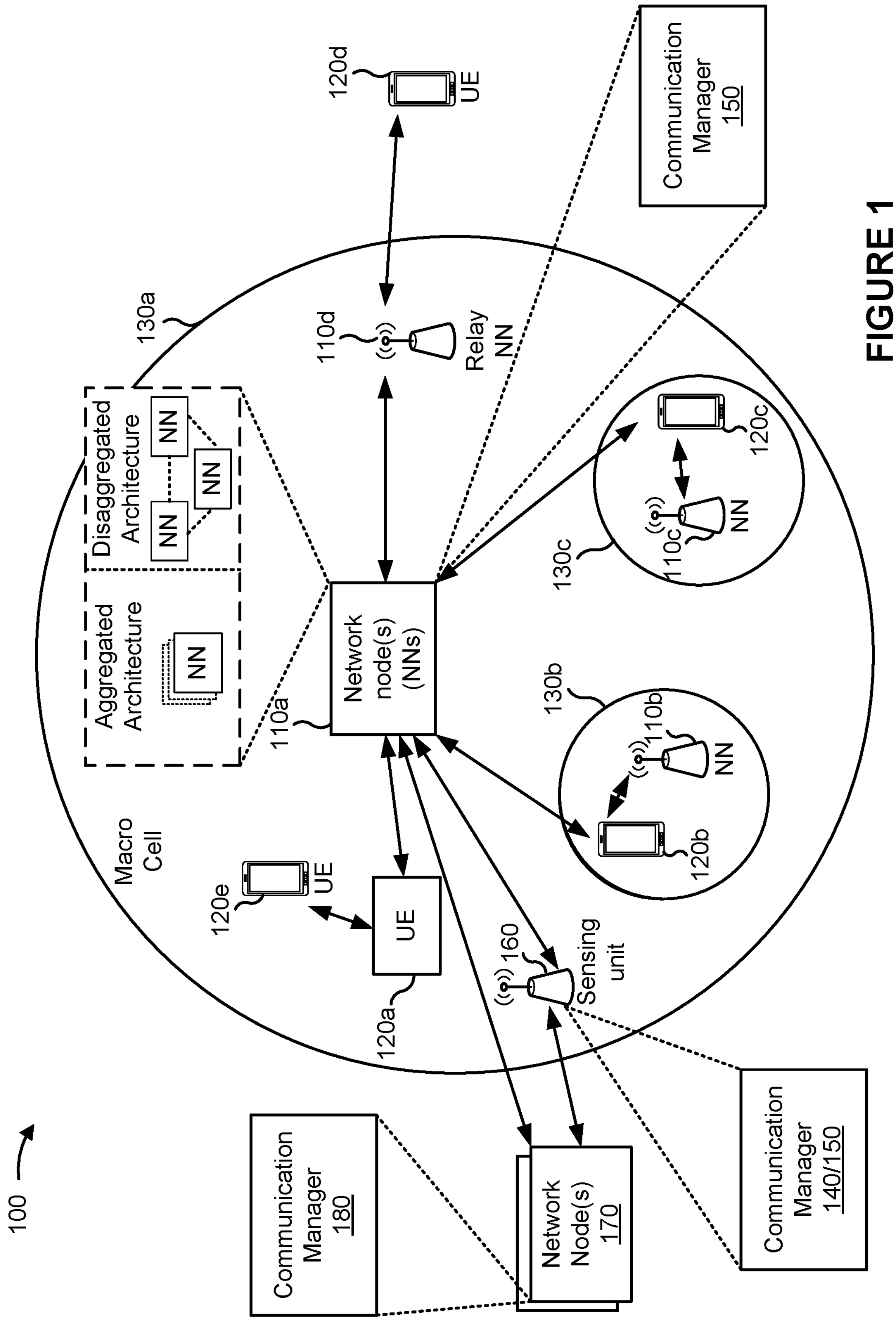
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Because radio frequency (RF) sensing operations are performed using wireless communication network resources, it may be difficult to correctly configure a sensing unit (SU) to perform RF sensing operations in accordance with current network conditions. For example, wireless communication channel conditions (for example, RF signal propagation characteristics) may change over time. Because the RF sensing operation monitors and evaluates characteristics of target objects in a given geographic area using RF signal propagation characteristics, the RF sensing operation may be dependent on a position of an SU (for example, relative to a target object) and/or dependent on wireless communication channel (for example, radio link) conditions. Because some SUs may be mobile and change position over time, and/or because network conditions may change over time, characteristics of an SU may be suitable to perform an RF sensing operation at a first time (for example, because of a position of the SU or a quality of the wireless communication channel at the first time). However, at a second time, the characteristics of the SU may not be suitable to perform the RF sensing operation (for example, because of a position of the SU or a quality of the wireless communication channel at the second time). Because a sensing service may be managed or configured by a network function entity (for example, a sensing management function (SnMF) entity), the change in characteristics of an SU may result in an SU being configured to perform an RF sensing operation inefficiently or ineffectively. For example, the network function entity may not have access to current network conditions and/or current positions of SUs in the wireless communication network. Therefore, the network function entity may be unable to determine when a position of an SU and/or when wireless communication channel quality for the SU changes. Additionally, a nature or a target object of a sensing operation may change over time. As a result, an SU may be configured to perform an RF sensing operation inefficiently or ineffectively.

Various aspects relate generally to adaptive reconfiguration of one or more SUs associated with a sensing service. Some aspects more specifically relate to adaptively configuring or reconfiguring sensing configurations for an SU based on, responsive to, or otherwise associated with detecting an event. In some aspects, the event may be based on, responsive to, or otherwise associated with wireless communication channel characteristics (for example, RF signal propagation conditions) or a position of an SU, among other examples. For example, an SU, a network node, or a network function entity (for example, an SnMF entity) may detect an event that satisfies one or more criteria. For example, the SU may switch a sensing state (for example, between a configured state, a non-configured state, or a non-registered state) based on, responsive to, or otherwise associated with the detection of an event.

As an example, the SU, the network node, or the network function entity may detect that one or more measurements (for example, performed by the SU) satisfies or does not satisfy a threshold. For example, the SU may be configured to perform measurements of a wireless communication channel (for example, using wireless communication reference signals, such as a synchronization signal of channel state information (CSI) reference signal (CSI-RS), or sensing reference signals). The SU, the network node, and/or the SnMF entity may obtain measurement information for the wireless communication channel. The SU, the network node, and/or the SnMF entity may detect the event based on the measurement information indicating that one or more measurement values satisfy or do not satisfy a threshold (for example, indicating a quality of the wireless communication channel to be used for RF sensing).

As another example, the SU, the network node, or the network function entity may detect that a position of the SU has changed or a distance between the SU and a target object or sensing area satisfies a threshold. The SU, the network node, or the network function entity may cause the SU to switch the sensing state based on, responsive to, or otherwise associated with the position of the SU or the distance between the SU and the target object or the sensing area. In some other aspects, the event may be based on, responsive to, or otherwise associated with mobility information of the SU (for example, a change in a serving cell), a change in a sensing capability of the SU, a change in one or more network condition parameters (for example, a change in a current network load or a network slicing parameter), a change in a sensing area, and/or a change in the sensing service, among other examples.

In some aspects, the network function entity may detect the event or receive an indication that the event has occurred. In such examples, the network function entity may cause the SU to modify the sensing state, a sensing session, and/or a sensing configuration of the SU. In other aspects, the SU may be configured with one or more adaptive reconfiguration rules. In such examples, the SU may cause the SU to modify the sensing state, the sensing session, and/or the sensing configuration of the SU based on, responsive to, or otherwise associated with detecting the event.

Particular aspects of the subject matter described in this disclosure can be implemented to realize one or more of the following potential advantages. In some examples, the described techniques can be used to ensure that a sensing state, a sensing session, and/or a sensing configuration of the SU is adapted to current wireless communication channel conditions, current network conditions, and/or a current position of the SU. This may improve an efficiency and/or effectiveness of RF sensing operations performed via a wireless communication network because the RF sensing operations performed by an SU may be based on, responsive to, or otherwise associated with the current wireless communication channel conditions, current network conditions, and/or a current position of the SU, among other examples. In some examples, by the SU transmitting a measurement report (for example, indicating measurement information) and the network function entity obtaining the measurement information, the network function entity is enabled to determine when to configure or reconfigure a sensing configuration for the SU using current wireless communication channel conditions. This may improve the efficiency of RF sensing operations and/or improve the selection of SUs (for example, by the network entity function) to perform RF sensing operations. In some examples, by the SU modifying the sensing state, the sensing session, and/or the sensing configuration of the SU based on, responsive to, or otherwise associated with detecting the event (and applying one or more adaptive reconfiguration rules), the described techniques can be used to enable the SU to automatically or autonomously adapt RF sensing operations in accordance with current wireless communication channel conditions, current network conditions, and/or a current position of the SU. This may reduce a latency and/or conserve network resources that would have otherwise been associated with a network node or the network function entity (re) configuring the sensing configuration.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*c*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular radio access technology (RAT) (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHZ through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In such examples, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced MTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some examples, the wireless communication network 100 may support an integrated sensing and communication (ISAC) service. "ISAC" may refer to a system that provides sensing capabilities (for example, RF sensing capabilities) using the same system and infrastructure (for example, the wireless communication network 100) that is used for communication. ISAC may sometimes be referred to as joint communication and radar (JCR). One or more devices in the wireless communication network 100, such as a UE 120, a network node 110, and/or an SU 160, may perform RF sensing via the wireless communication network 100 (for example, using one or more RF signals). RF sensing is a technology that enables wireless communication devices to acquire information about characteristics of the environment and/or objects within the environment. RF sensing uses RF signals to determine the distance (range), angle, and/or instantaneous linear velocity, among other examples, of objects. RF sensing may provide a range of functionality for wireless communication devices, such as object detection, object recognition (for example, vehicle, human, or animal), object tracking, environment monitoring, motion monitoring, high accuracy localization, health monitoring, immersive XR application, home monitoring, weather monitoring, automotive operations (for example, maneuvering, navigation, and/or parking), pedestrian and/or obstacle monitoring for roadways and/or railways, unmanned ariel vehicle (UAV) operations (for example, UAV intrusion detection, UAV tracking, and/or collision avoidance), industrial operations (for example, automated guided vehicles (AGV), automated robots, and/or pedestrian monitoring), tracking, and/or activity recognition, among other examples.

RF sensing may include communication-assisted sensing and/or sensing-assisted communication. "Communication-assisted sensing" may refer to a wireless communication device, such as an SU 160, performing RF sensing using one or more hardware components and/or radio resources that are associated with communication. For example, the SU 160 may obtain information indicative of characteristics of the environment and/or objects within the environment using RF signals (for example, NR RF signals or other RF signals associated with wireless communication). "Sensing-assisted communication" may refer to a wireless communication device using sensing results to perform one or more communication operations. For example, sensing results may improve communication performance, such as by enabling more accurate beamforming, faster beam failure recovery, and/or reduced overhead for channel state information (CSI) tracking, among other examples.

For example, the wireless communication network 100 may include one or more SUs 160. An SU 160 may include a UE 120, a network node 110, a TRP, an IAB node, a RAN node, and/or another wireless communication device capable of performing RF sensing. In some examples, an SU 160 may obtain sensing data via radio signals (sometimes referred to as 3GPP sensing data, 5G wireless sensing data, 6G wireless sensing data, or wireless sensing data). Additionally or alternatively, the SU 160 may obtain sensing data via one or more sensors, such as a camera, a video recorder, a light detection and ranging (LiDAR) sensor, a radar, and/or a sonar sensor, among other examples. For example, the SU 160 may obtain sensing data via Wi-Fi sensing, radar sensing, and/or another type of sensing. Sensing data obtained via a sensor (sometimes referred to as non-3GPP sensing data) may be used by the SU 160 (or another device) to determine characteristics of objects and/or characteristics of the environment. The non-3GPP sensing data may be used to achieve improved sensing results for wireless sensing performed by the SU 160.

The wireless communication network 100 may include one or more network nodes 170. A network node 170 may include a core network node, a core network entity, and/or a core network function, among other examples. A network node 170 may include an SnMF entity, an AMF entity, a gateway, a network repository function (for example, one or more sensing repositories (SRs)), among other examples. The SnMF entity may perform one or more operations for configuring, managing, and/or maintaining sensor configurations for one or more sensing requests. For example, a network node 170 may obtain a sensing request from a client device (for example, a server device or a sensing client) and configure one or more SUs 160 to perform RF sensing to obtain sensing data in accordance with the sensing request, as described in more detail elsewhere herein. As shown in FIG. 1, a network node 170 may communicate with an SU 160 (for example, directly and/or via a network node 110) to configure and/or manage an RF sensing operation.

In some aspects, the SU 160 may include a communication manager 140 or a communication manager 150. As described in more detail elsewhere herein, the communication manager 140 or the communication manager 150 may perform, in accordance with operating according to a first sensing state, a first set of one or more operations associated with a sensing service; obtain, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service; and perform, in accordance with operating according to the second sensing state, a second set of one or more operations associated with the sensing service. Additionally or alternatively, the communication manager 140 or the communication manager 150 may perform one or more other operations described herein.

In some aspects, the network node 170 (for example, an SnMF entity) may include a communication manager 180. As described in more detail elsewhere herein, the communication manager 180 may receive information for an SU associated with a sensing service, the information being indicative of whether an event satisfies one or more criteria; and transmit, to the SU and in association with the information indicating that the event satisfies the one or more criteria, an indication to modify at least one of a sensing state or a sensing configuration of the SU. Additionally or alternatively, the communication manager 180 may perform one or more other operations described herein.

Figure 2:
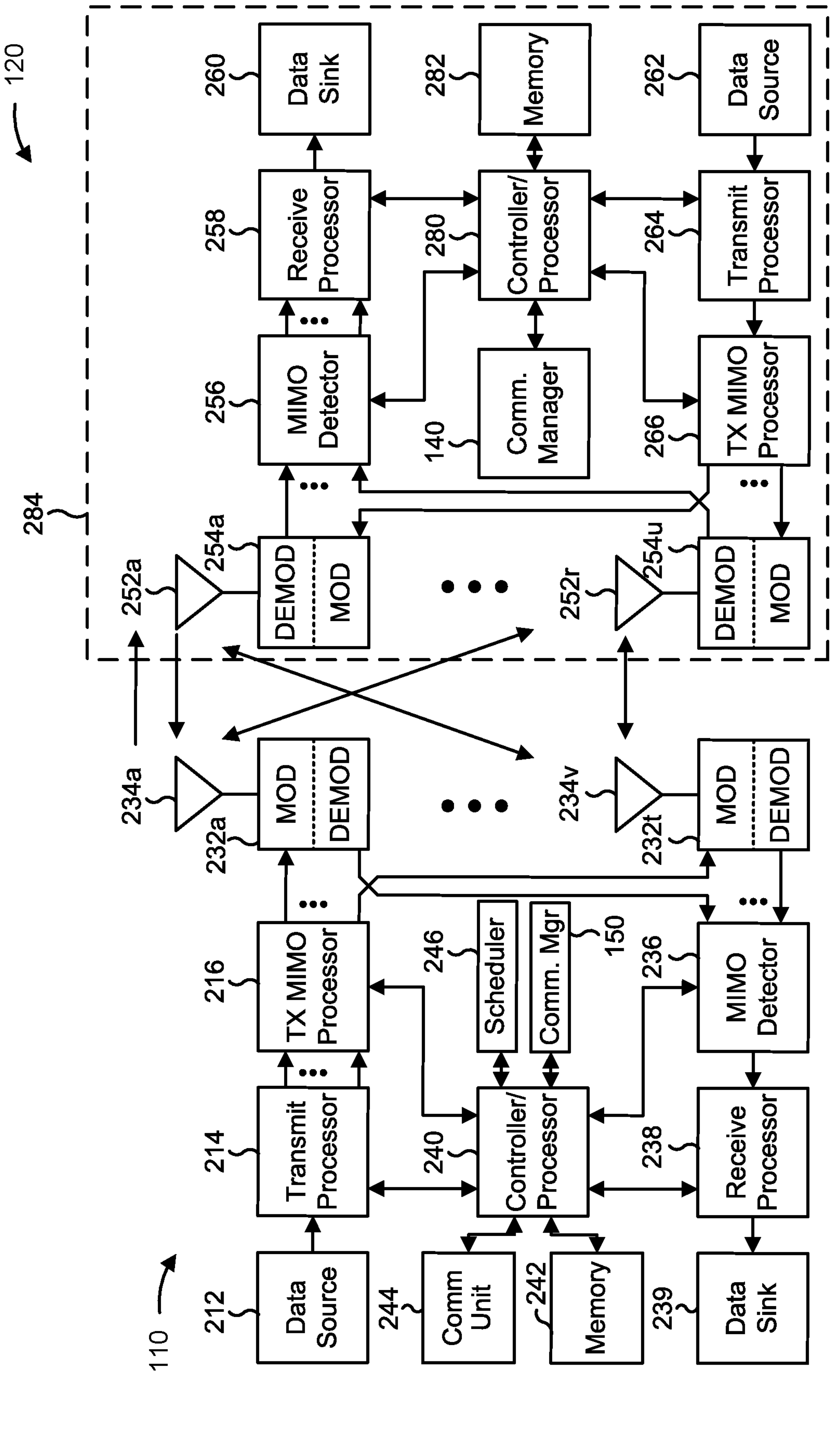
FIG. 2 is a diagram illustrating an example network node in communication with an example UE in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems **254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120**) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different quantities of antenna elements. For example, a UE 120 may include a single antenna element, two antenna elements, four antenna elements, eight antenna elements, or a different quantity of antenna elements. As another example, a network node 110 may include eight antenna elements, 24 antenna elements, 64 antenna elements, 128 antenna elements, or a different quantity of antenna elements. Generally, a larger quantity of antenna elements may provide increased control over parameters for beam generation relative to a smaller quantity of antenna elements, whereas a smaller quantity of antenna elements may be less complex to implement and may use less power than a larger quantity of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
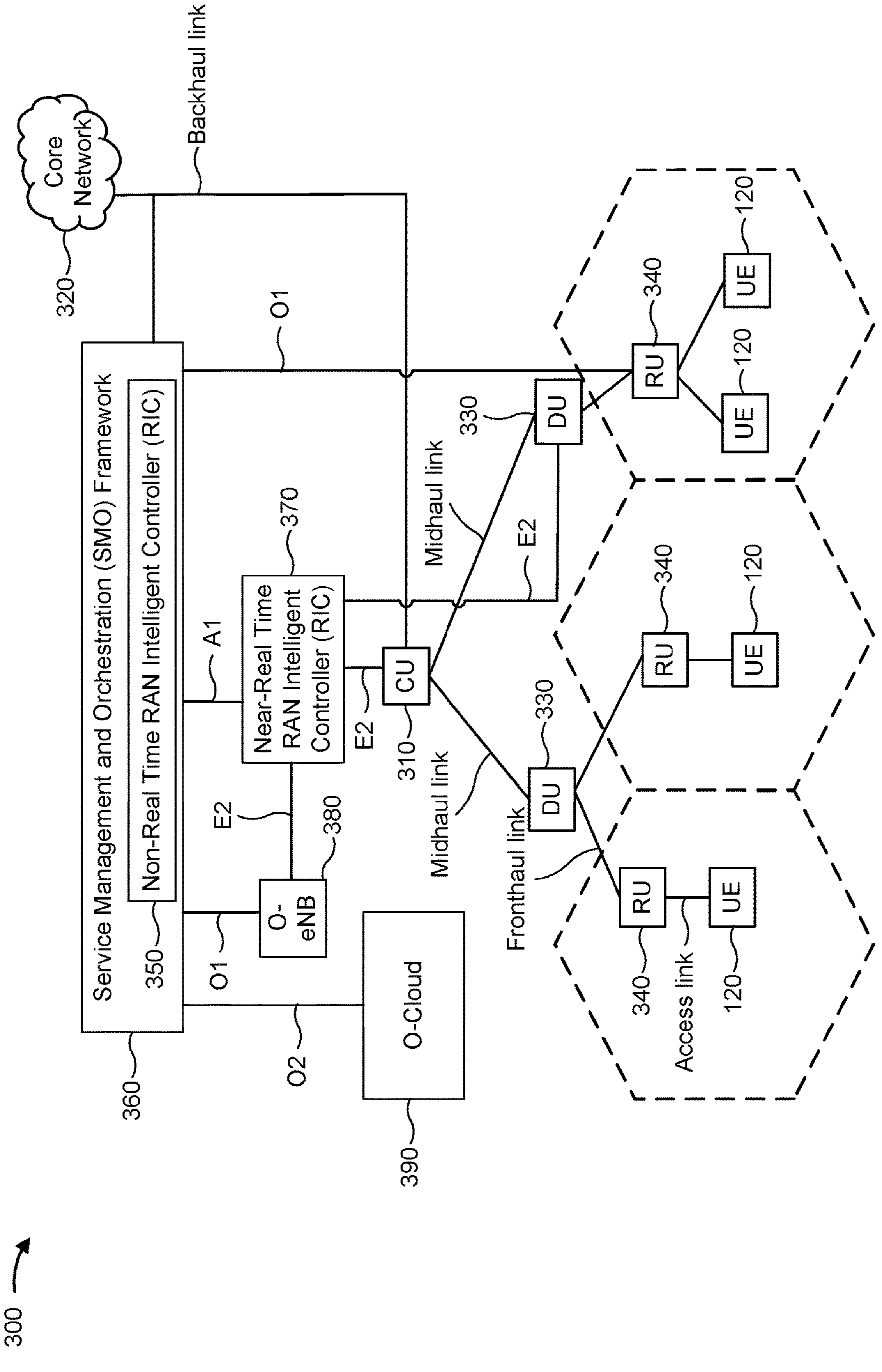
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-cNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As used herein, a first device "outputting" or "transmitting" a communication to a second device may refer to a direct transmission (for example, from the first device to the second device) or an indirect transmission via one or more other network nodes or devices. For example, if the first device is a DU, an indirect transmission to the UE 120 may include the DU outputting or transmitting a communication to an RU and the RU transmitting the communication to the second device, or may include causing the RU to transmit the communication (e.g., triggering transmission of a physical layer reference signal). Similarly, the second device "obtaining" or "receiving" a communication from the second device may refer to a direct transmission (for example, from the first device to the second device) or an indirect transmission via one or more other network nodes or devices. For example, if the first device is a network function entity, an indirect transmission to the second device may include the first device transmitting a communication to another network function entity or a network node 110 and the other network function entity or the network node 110 transmitting the communication to the second device. For example, the second device "obtaining" or "receiving" a communication may refer to receiving a transmission carrying the communication directly or receiving the communication (or information derived from reception of the communication) via one or more other network nodes or devices.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with a sensing service adaptive reconfiguration, as described in more detail elsewhere herein. For example, a controller/processor of the network node 170, the controller/processor 240 of the network node 110, the controller/processor 280 of the UE 120, any other component(s) of FIG. 2, the CU 310, the DU 330, or the RU 340 may perform or direct operations of, for example, process 900 of FIG. 9, process 1000 of FIG. 10, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 170, the network node 110, the UE 120, the CU 310, the DU 330, or the RU 340, may cause the one or more processors to perform process 900 of FIG. 9, process 1000 of FIG. 10, or other processes as described herein. In some examples, executing instructions may include running the instructions, converting the instructions, compiling the instructions, and/or interpreting the instructions, among other examples.

In some aspects, the SU 160 includes means for performing, in accordance with operating according to a first sensing state, a first set of one or more operations associated with a sensing service; means for obtaining, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service; and/or means for performing, in accordance with operating according to the second sensing state, a second set of one or more operations associated with the sensing service. In some aspects, the means for the SU 160 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the SU 160 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 170 includes means for receiving information for an SU associated with a sensing service, the information being indicative of whether an event satisfies one or more criteria; and/or means for transmitting, to the SU and in association with the information indicating that the event satisfies the one or more criteria, an indication to modify at least one of a sensing state or a sensing configuration of the SU. The means for the network node 170 to perform operations described herein may include, for example, one or more of communication manager 180, a transmit processor, a TX MIMO processor, a modem, an antenna, a MIMO detector, a receive processor, a controller/processor, memory, or a scheduler.

Figure 4A:
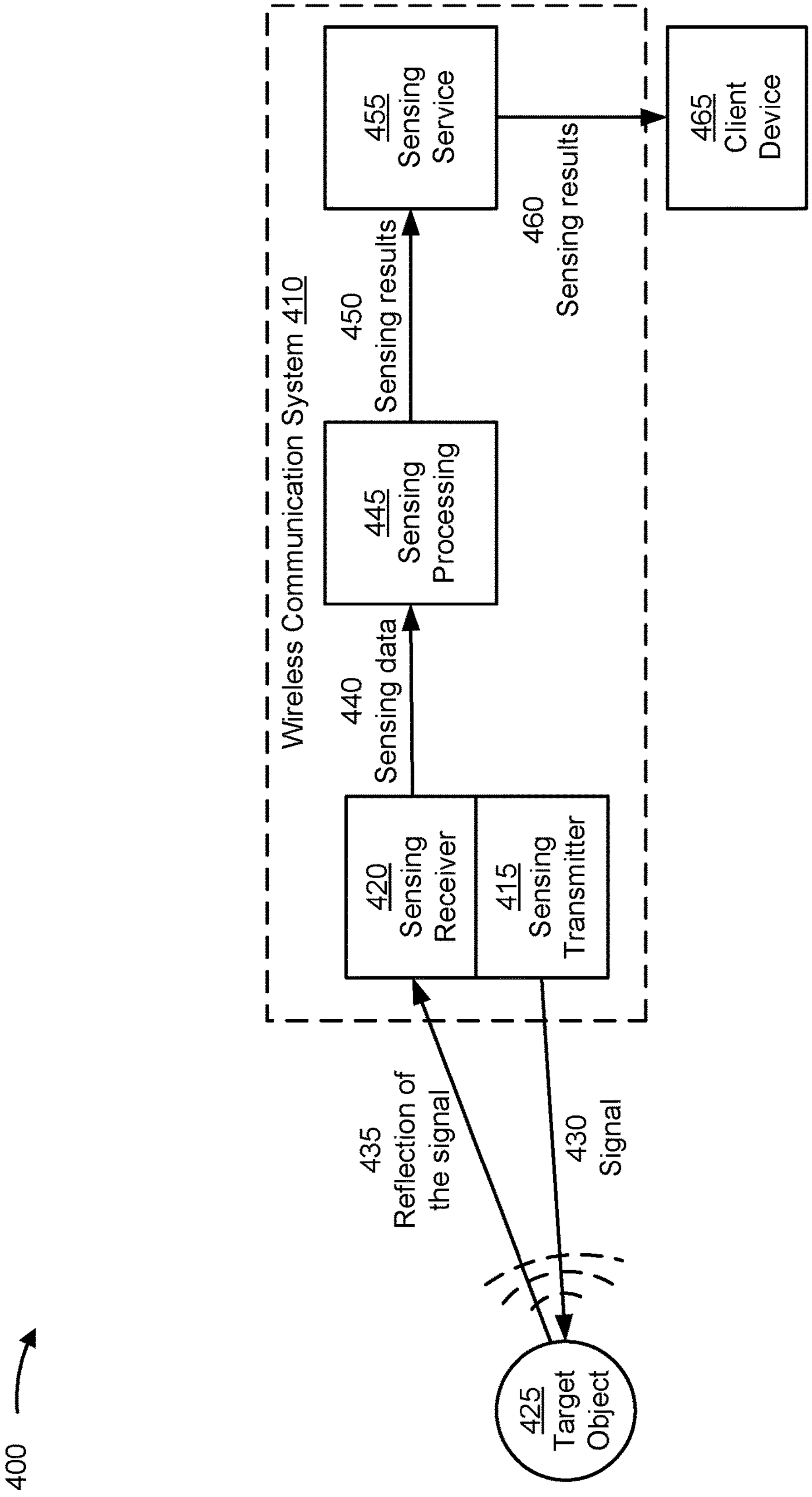
FIGS. 4A and 4B are diagrams illustrating examples of RF sensing in accordance with the present disclosure.
Figure 4B:
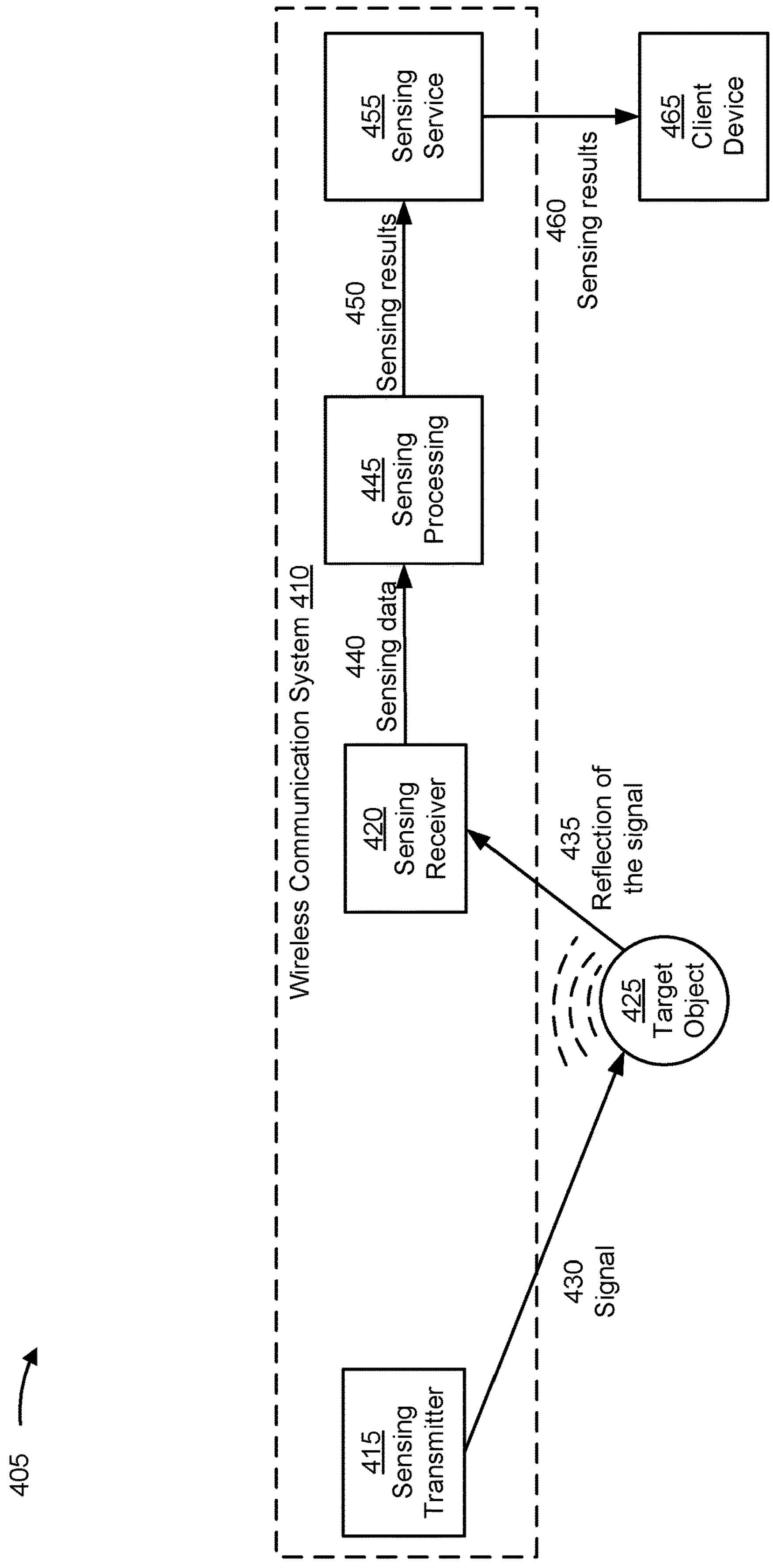

FIGS. 4A and 4B are diagrams illustrating examples of RF sensing in accordance with the present disclosure. Wireless communication signals (for example, RF signals configured to carry OFDM symbols) transmitted between a UE 120 and a network node 110 can be reused for RF sensing. Using wireless communication signals for RF sensing can be considered consumer-level radar with advanced detection capabilities that enable, among other things, touchless/device-free interaction with a device/system. "RF sensing" may be a radar operation performed by a wireless communication device, such as a UE, a network entity, or another device (such as a wireless local area network (WLAN) access point), using wireless communication signals.

RF sensing may also be referred to as environment sensing, radar sensing, WLAN sensing, Wi-Fi sensing, and/or wireless sensing, among other examples. The wireless communication signals used to perform RF sensing may be cellular communication signals (for example, LTE signals, NR signals, and/or 6G signals) or WLAN signals (for example, Wi-Fi signals), among other examples. As an example, the wireless communication signals may be an OFDM waveform as utilized in the wireless communication network 100. High-frequency communication signals, such as millimeter wave signals, may be beneficial to use as RF sensing signals because the higher frequency provides a more accurate range (for example, distance) detection and/or motion detection. As another example, WLAN signals (for example, WLAN or Wi-Fi signals that would otherwise be used for wireless communication) may be used to perform RF sensing (for example, to conserve power relative to using a higher frequency range signal). In such examples, the RF sensing may be referred to as WLAN sensing or Wi-Fi sensing.

RF sensing may be performed using various frequency bands or frequency ranges, such as the millimeter wave band or the sub-6 GHz band, among other examples. In some examples, different frequencies may be used sequentially (for example, first using a sub-6 GHz frequency and second using a millimeter wave frequency) by a wireless communication device performing the RF sensing to vary a resolution (for example, from coarse to fine), vary a detection range (for example, from large to narrow), and/or vary power consumption (for example, from low to high), among other examples.

As shown in FIGS. 4A and 4B, one or more SUs may detect and/or monitor a target object by transmitting and/or measuring wireless communication signals. FIG. 4A depicts an example of monostatic sensing 400. For example, the one or more SUs may be included in a wireless communication system 410, such as the wireless communication network 100. A sensing transmitter 415 and a sensing receiver 420 may communicate RF signals (for example, wireless communication signals) to perform RF sensing. In some examples, the sensing transmitter 415 and the sensing receiver 420 may be co-located, such as in a single SU (for example, as depicted in FIG. 4A). Examples where the sensing transmitter 415 and the sensing receiver 420 are co-located may be referred to as "monostatic sensing." FIG. 4B depicts an example of bistatic sensing 405. For example, the sensing transmitter 415 and the sensing receiver 420 may not be co-located (for example, as depicted in FIG. 4B). For example, the sensing transmitter 415 and the sensing receiver 420 may be included in separate devices, such as in separate SUs. Examples where the sensing transmitter 415 and the sensing receiver 420 are not co-located (for example, are included in different entities) may be referred to as "bistatic sensing." In some examples, RF sensing may be associated with obtaining sensor data that is indicative of a characteristic of a target object 425. In other examples, an RF sensing operation may include multiple sensing transmitters 415 and/or multiple sensing receivers 420 (for example, referred to as "multistatic sensing").

As shown in FIGS. 4A and 4B, the sensing transmitter 415 may transmit one or more signals 430. The one or more signals 430 may be RF signals, wireless communication signals, OFDM signals, and/or sensing reference signals, among other examples. The one or more signals may reflect off of the target object 425, resulting in a reflection 435 of the signal 430. The reflection 435 may be a reflection of a signal 430, a refraction of the signal 430, a diffraction of the signal 430, and/or a deflected version of the signal 430, among other examples. The sensing receiver 420 may receive and/or detect the reflection 435. The sensing receiver 420 may perform one or more measurements of the reflection 435 to obtain sensing data 440. The sensing data 440 may include information that is indicative of one or more characteristics of the target object 425. For example, the sensing data 440 may include a signal strength (for example, an RSRP), a received raw signal sample, a channel delay profile, one or more Doppler measurements (for example, Doppler per channel tap), CSI, CQI, time delay measurements, and/or an angle of arrival (AoA) (for example, AoA per channel tap), among other examples.

As shown in FIGS. 4A and 4B, sensing processing 445 may be performed using the sensing data 440 to obtain sensing results 450. In some examples, an SU (for example, that includes the sensing receiver 420) may perform the sensing processing 445. In such examples, the SU may transmit, to a network node 110, the sensing results 450. In other examples, another device, such as a network node 110, may perform the sensing processing 445. In such examples, an SU (for example, that includes the sensing receiver 420) may transmit, and the network node 110 may receive, the sensing data 440. The sensing results 450 may include information for one or more characteristics of the target object 425. For example, the sensing results 450 may include positioning information, velocity information, a sensing resolution, object detection information, and/or other information that is determined using the sending data 440. The sensing results 450 may be provided to a sensing service 455 of the wireless communication system 410. The sensing service 455 may include one or more core network nodes or entities, such as one or more network nodes 170. For example, the sensing service 455 may include an SnMF entity, as described in more detail elsewhere herein. The sensing service 455 may provide, to a client device 465, sensing results 460. The sensing results 460 may be the sensing results 450 or may be based on the sensing results 450. The client device 465 may be a server device or an application executing on a device. For example, the client device 465 may provide, to the sensing service 455, a sensing request. The sensing service 455 may configure, manage, and/or otherwise maintain a sensing operation (for example, in a similar manner as described herein) for fulfilling the sensing request.

Possible use cases of RF sensing include health monitoring (such as heartbeat detection, and/or respiration rate monitoring, among other examples), gesture recognition (such as human activity recognition, keystroke detection, and/or sign language recognition, among other examples), contextual information acquisition (such as location detection/tracking, direction finding, and/or range estimation, among other examples), and/or automotive radar (such as smart cruise control and/or collision avoidance), among other examples.

Similar to conventional radar (for example, frequency modulation continuous waveform (FMCW) radar), a signal 430 can be used to estimate the range (for example, distance), velocity (for example, Doppler spread), and/or angle (for example, AoA) of the target object 425. Unlike conventional radar, RF sensing may use a PHY layer for both RF sensing measurements and wireless communication. Signals 430 may be transmitted in a beam (for example, using beamforming) and may reflect off nearby objects within the beam. A portion of the transmitted RF signals is reflected back toward a sensing receiver 420, which the reflection 435 (for example, via the reflections of the transmitted signals).

In some examples, an OFDM waveform can be used for both wireless communication (for example, over a wireless network) and RF sensing. To use an OFDM waveform as a signal for RF sensing, specific reference signals, which may be referred to herein as sensing reference signals, may be needed. The RF sensing performance (for example, resolution and maximum values of range, velocity, and/or angle) may depend on the sensing reference signal design. For example, for a gesture recognition use case, coarse range/velocity estimation may be sufficient for the RF sensing. That is, it may be sufficient for a wireless communication device to be able to detect a pattern of movement relative to the current position of the target object 425 (for example, a user's hand or head). In such examples, a low density (for example, sparse) sensing reference signal with a short wavelength and narrow bandwidth may be sufficient to provide the necessary range and velocity resolution. For a vibration detection use case, such as for respiration monitoring, accurate Doppler estimation may be important, whereas accurate range estimation may not be as important. In such examples, a high-density sensing reference signal with a long duration in the time domain may be beneficial. For a location detection use case, such as for object detection, accurate range estimation may be important, whereas accurate Doppler estimation may not be as important. In such examples, a high-density wideband sensing reference signal in the frequency domain may be beneficial. Therefore, a network entity may configure one or more sensing reference signals depending on a use case of the RF sensing to improve the RF sensing performance. In some examples, a sensing reference signal may be a sounding reference signal (SRS), a wireless communication reference signal, or a WLAN signal, among other examples.

Figure 5:
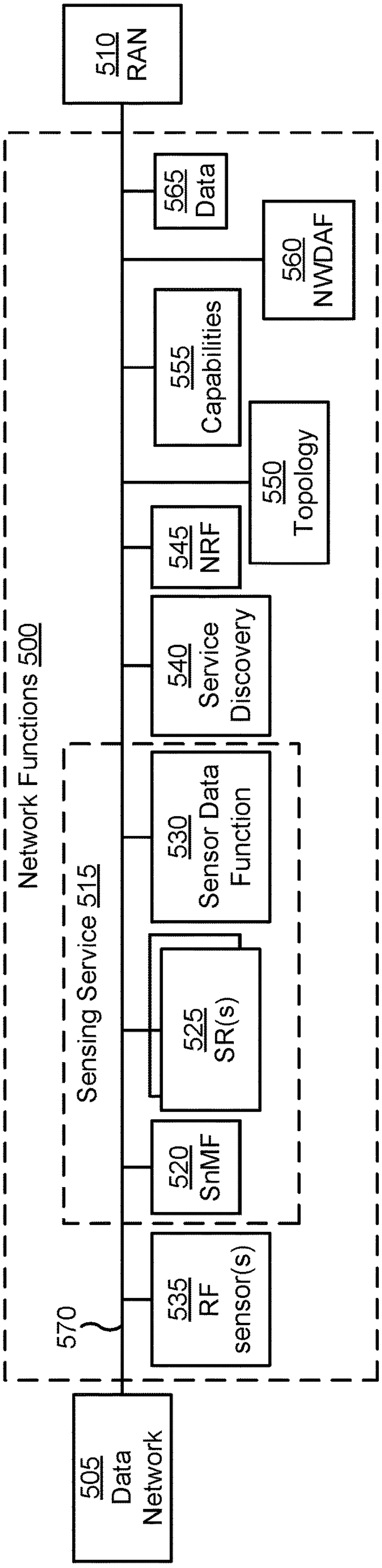
FIG. 5 is an example of network functions configured to provide sensing services in accordance with the present disclosure.

FIG. 5 is an example of network functions 500 configured to provide sensing services in accordance with the present disclosure. The network functions 500 may enable communication via a data network 505 and a RAN 510. The network functions 500 may be a 5G core network, a 6G core network, a next generation (NG) core network, or another type of core network. The RAN 510 may be the wireless communication network 100. The data network 505 may include one or more wired and/or wireless data networks. For example, the data network 505 may include an IP Multimedia Subsystem (IMS), a public land mobile network (PLMN), a local area network (LAN), a wide area network (WAN), a metropolitan area network (MAN), a private network (such as a corporate intranet), an ad hoc network, the Internet, a fiber optic-based network, a cloud computing network, a third party services network, an operator services network, and/or a combination of these or other types of networks.

The network functions 500 may include an example functional architecture in which systems and/or methods described herein may be implemented. As shown in FIG. 5, the network functions 500 may include one or more functional elements (for example, one or more functions or entities) configured to provide a sensing service 515 (for example, an RF sensing service or an ISAC service). For example, the core network 505 may include an SnMF entity 520. The SnMF entity 520 may be configured to perform discovery of SUs, configuration of SUs, collection of sensing data from one or more SUs, processing of sensing data, and/or exposure of sensing results, among other examples. The network functions 500 may include one or more sensing repositories (SRs) 525. An SR 525 may be a repository that is configured to store information for one or more SUs, such as SU locations, and/or SU capabilities, among other examples. In some examples, the one or more SRs 525 may include a UE sensing repository that is configured to store information for UEs (for example, configured to operate in the RAN 510) that are capable of operating as an SU. Additionally, the one or more SRs 525 may include a TRP sensing repository that is configured to store information for TRPs and/or network nodes (for example, configured to operate in the RAN 510) that are capable of operating as an SU. In some examples, an SR 525 may include information for both UEs and TRPs that are capable of operating as an SU. In some examples, the one or more SRs 525 may be dedicated services within the SnMF 520. In other examples, the one or more SRs 525 may be part of another network function, such as an AMF or a network repository function (NRF) 545. In other examples, the SR 525 may be a standalone network function. The network functions 500 may include a sensor data function 530. The sensor data function 530 may be configured to perform processing of sensor data (for example, collected via one or more SUs in the RAN 510) to produce sensing results, as described in more detail elsewhere herein.

The network functions 500 may include one or more RF sensors 535 configured to obtain sensor data. The one or more RFs sensors 535 may include a camera, a LIDAR sensor, a radar sensor, a sonar sensor, and/or a Wi-Fi sensor, among other examples. The one or more RF sensors 535 may be referred to as non-3GPP sensors. The network functions 500 may include a service discovery function 540. The service discovery function 540 may be configured to store information for one or more services supported by the network functions 500 and/or the RAN 510. In some examples, the service discovery function 540 may be configured to provide an indication (for example, to one or more devices in the RAN 510, such as one or more network nodes 110) of the one or more services supported by the network functions 500, such as the sensing service described herein. For example, the service discovery function 540 may include one or more devices that support exposure of capabilities and/or events in the wireless telecommunications system to help other entities in the wireless telecommunications system discover network services. The service discovery function 540 may also be referred to as a network exposure function (NEF).

The network functions 500 may include an NRF 545. The NRF 545 may be configured as a centralized repository for one or more network functions supported by the network functions 500 and/or the RAN 510. For example, other functional elements of the network functions 500 may access the NRF 545 to obtain information for a function or service provided by the network functions 500, such as the sensing service described herein. The network functions 500 may include a topology entity 550. The topology entity 550 may be configured to store and/or manage information for a network topology, such as a topology of the RAN 510. The network functions 500 may include a capabilities entity 555. The capabilities entity 555 may store information indicating capabilities of respective nodes or devices (for example, in the RAN 510). The network functions 500 may include a network data analytics function (NWDAF) 560. The NWDAF 560 may include one or more devices that gathers information associated with UEs 120, SUs, and/or the RAN 510. The NWDAF 560 may calculate analytics based on the gathered information. Different portions of the network functions 500 may subscribe to receive analytic updates from the NWDAF 560. In some examples, the sensor data function 530 may be a component of the NWDAF 560. The network functions 500 may include a data function entity 565. The data function entity 565 may be configured to determine, obtain, and/or provide data for the RAN 510.

The network functions 500 may include other functional elements that are not depicted in FIG. 5, such as a network slice selection function (NSSF), a network exposure function (NEF), an authentication server function (AUSF), a unified data management (UDM) component, a policy control function (PCF), an application function (AF), an access and mobility management function (AMF), a session management function (SMF), and/or a user plane function (UPF), among other examples. As shown in FIG. 5, functional elements of the network functions 500 may communicate via a message bus 570. The message bus 570 may be a logical and/or physical communication structure for communication among the functional elements. Accordingly, the message bus 570 may permit communication between two or more functional elements, whether logically (for example, using one or more application programming interfaces (APIs), among other examples) and/or physically (for example, using one or more wired and/or wireless connections).

Figure 6:
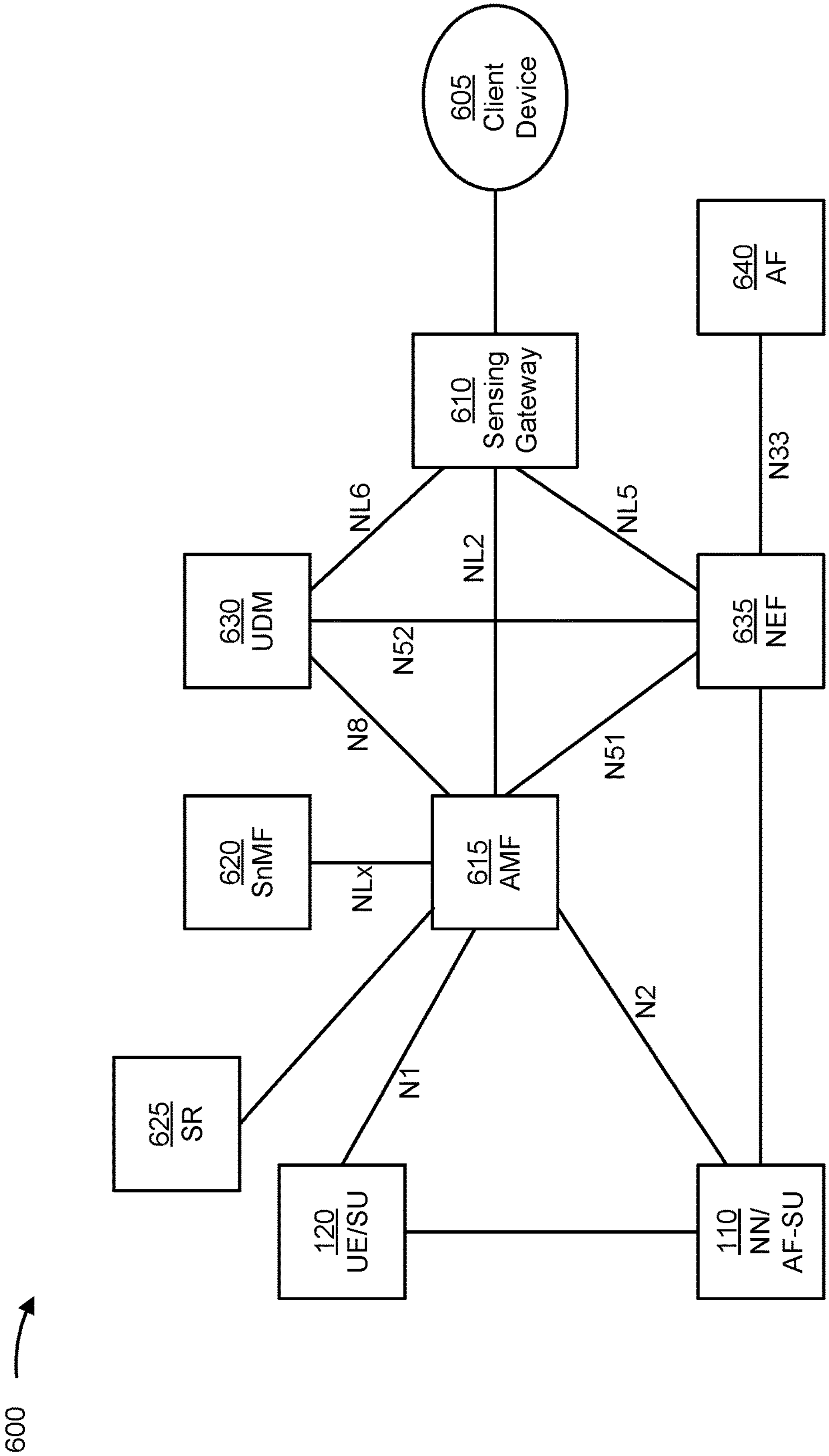
FIG. 6 is an example of a control plane architecture associated with a sensing service in accordance with the present disclosure.

FIG. 6 is an example of a control plane architecture 600 associated with a sensing service in accordance with the present disclosure. As shown in FIG. 6, the control plane architecture 600 may include a client device 605. The client device 605 may be a location service (LCS) client or a sensing service client. The client device 605 may provide a sensing request associated with the sensing service.

The control plane architecture 600 may include a sensing gateway 610. The sensing gateway 610 may be configured as a gateway between the client device 605 and a core network, such as the network functions 500. The sensing gateway 610 may enable one or more network functions, such as traffic routing, policy enforcement, charging, quality of service (QOS) management, and/or security, among other examples. For example, the sensing gateway 610 may route a sensing request from the client device 605 to an AMF 615 and/or to an SnMF 620. In other examples, the AMF 615 may route the sensing request to an appropriate SnMF 620. The sensing gateway 610 and the AMF 615 may communicate via an interface (shown as an NL2 interface). The AMF 615 may communicate with one or more SnMFs 620. For example, the AMF 615 and an SnMF 620 may communicate via an interface, such as an NLx interface (for example, as defined, or otherwise fixed, by a wireless communication standard, such as the 3GPP). An SnMF may be configured to operate as a trusted application service provider (ASP) entity for provisioning non-3GPP-RF sensors (shown in FIG. 6 as an application function (AF) 640).

The control plane architecture 600 may include one or more SRs 625. As described elsewhere herein, an SR 625 may be a logical control function configure to store the identity, location, and/or capabilities of available SUs within a wireless communication network. An SR 625 may provide an indication (for example, may expose) the available SUs to one or more SnMFs 620. In some examples, the functionality of an SR may be performed by another network function, such as the AMF 615, an NRF (not shown in FIG. 6), and/or the SnMF 620. The control plane architecture 600 may include a UDM 630. The UDM 630 may include one or more devices that store user data and profiles in the wireless telecommunications system. In some aspects, the UDM 630 may be used for fixed access and/or mobile access, among other examples, in the core network.

The control plane architecture may include one or more UEs 120 and/or one or more network nodes 110. As described elsewhere herein, a UE 120 may be configured to operate as an SU for a sensing service (for example, by the SnMF 620, the AMF 615, and/or a network node 110). Additionally, a network node 110 may be configured to operate as an SU (for example, an application function (AF) SU) for a sensing service (for example, by the SnMF 620, the AMF 615, and/or another network node 110). The control plane architecture may include an NEF 635 that communicates with one or more AFs 640. An AF 640 may be an RF sensor, such as a camera, a LiDAR sensor, a radar sensor, a sonar sensor, a Wi-Fi sensor, or another non-3GPP RF sensor.

Figure 7:
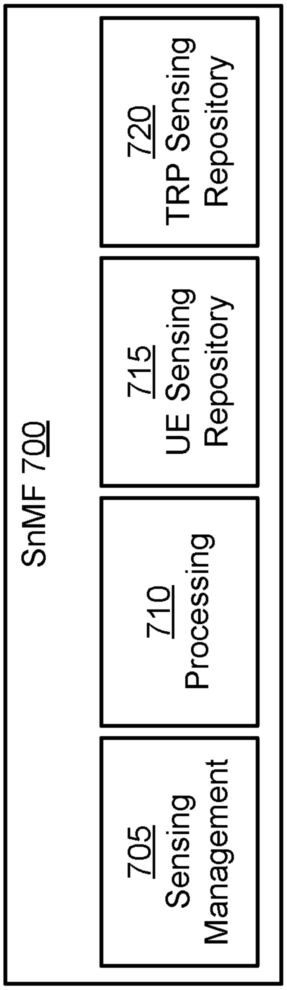
FIG. 7 is an example of a sensing management function (SnMF) entity associated with a sensing service in accordance with the present disclosure.

FIG. 7 is an example of an SnMF entity 700 associated with a sensing service, in accordance with the present disclosure. The SnMF entity 700 may include one or more functional components configured to perform operations for a sensing service, as described herein. For example, the SnMF entity 700 may be configured to perform discovery and/or configuration of SUs, collection of sensing data, processing of sensing data, and/or exposure of sensing results, among other examples. The SnMF entity 700 may include a sensing management component 705, a processing component 710, a UE sensing repository 715, and/or a TRP sensing repository 720, among other examples.

The sensing management component 705 may be configured to perform one or more operations for the discovery and/or configuration of SUs, as described in more detail elsewhere herein. The processing component 710 may be configured to generate or determine sensing results based on, in response to, or otherwise associated with collected sensor data (for example, collected from one or more SUs). The processing component 710 may be physically executed at different (distributed) locations depending on a computing architecture of the SnMF entity 700. The UE sensing repository 715 may store information for one or more UEs that are configured to operate as an SU, such as an identify of the UEs, a location of the UEs, and/or one or more capabilities of the UEs, among other examples. The TRP sensing repository 720 may store information for one or more TRPs that are configured to operate as an SU, such as an identify of the TRPs, a location of the TRPs, and/or one or more capabilities of the TRPs, among other examples. The UE sensing repository 715 and/or the TRP sensing repository 720 may be a dedicated service within the SnMF entity 700. Alternatively, the UE sensing repository 715 and/or the TRP sensing repository 720 may be included in another network function, such as an AMF or an NRF. In some examples, the SnMF entity 700 may include an SR that stores information for one or more TRPs and one or more UEs that are configured to operate as an SU.

In some examples, a wireless communication network may be associated with a single SnMF entity 700 for each PLMN. In such examples, the SnMF entity 700 may be configured as the single entry and exit point for the sensing service. In such examples, there may be a single logical SnMF entity 700 that may be implemented via multiple (distributed) SnMF instances. In other examples, multiple SnMF entities 700 may be defined and/or may be accessible. For example, SnMF entities 700 may be defined for respective service areas and/or respective service types. For example, a given SnMF entity 700 may be associated with a supported service area (for example, a geographical area over which the SnMF is managing a sensing service), one or more supported service types, one or more supported QoS parameters for each supported service type, and/or one or more other capabilities. In some examples, one or more SnMF functionalities may be common across multiple SnMF entities 700. For example, one or more SRs may be accessed by multiple SnMF entities 700.

As described elsewhere herein, the sensing service may be associated with configuring one or more SUs to perform RF sensing to fulfill one or more sensing requests. In a wireless communication network, different devices may be capable of serving as an SU. However, the different devices may be associated with different capabilities, different locations, and/or different guidelines for when the device can be configured to perform RF sensing. For example, a UE may be associated with different RF sensing capabilities than a network node or a TRP. Additionally, introducing RF sensing as an ISAC service introduces additional considerations for configuring a given device as an SU. For example, network load information, link quality, and/or availability of wireless communication resources, among other examples, may impact configuration decisions for SUs in the wireless communication network. Further, when introducing RF sensing technology as a new system capability, new considerations on authorization for service access and operation access, data confidentiality, data integrity, and/or user privacy are needed, to ensure that these aspects are taken into account when deriving sensing service requirements.

As a result, discovery and configuration for SUs within a wireless communication network may be a complex task requiring the coordination of several different network entities and/or network nodes. Currently, no procedures or protocols are defined for the discovery and configuration for SUs, which may result in one or more SUs failing to be registered or identified (for example, and therefore not participating in the sensing service provided by the wireless communication network). Additionally, this may result in one or more SUs being configured to perform sensing operations that the SU(s) are not capable of performing. For example, a wireless communication network may not currently support coordinating RF sensing among multiple network nodes and/or UEs, obtaining RF sensing capabilities from multiple network nodes and/or UEs, coordinating configuration and authorization for performing RF sensing by multiple network nodes and/or UEs, and/or providing a mechanism to provide RF sensing capable devices with information indicative of which network entity the devices are to transmit sensing data, among other examples.

Further, because the RF sensing operations are performed using wireless communication network resources, it may be difficult to correctly configure an SU to perform RF sensing operations in accordance with current network conditions. For example, wireless communication channel conditions (for example, RF signal propagation characteristics) may change over time. Because the RF sensing operation monitors and evaluates characteristics of target object in a given geographic area using RF signal propagation characteristics, the RF sensing operation may be dependent on a position of an SU (for example, relative to a target object) and/or wireless communication channel (for example, radio link) conditions. For example, for bi-static RF sensing, a range or quality of RF sensing may be based on or otherwise associated with a distance or link quality between a transmitter and a receiver. In a wireless communication network, some SUs may be mobile and change position over time. Additionally, network conditions may change over time. Therefore, characteristics of an SU may be suitable to perform an RF sensing operation at a first time (for example, because of a position of the SU or a quality of the wireless communication channel at the first time). However, at a second time, the characteristics of the SU may not be suitable to perform the RF sensing operation (for example, because of a position of the SU or a quality of the wireless communication channel at the second time). Because a sensing service may be managed or configured by a network function entity (for example, an SnMF entity), the change in characteristics of an SU may result in an SU being configured to perform RF sensing operation inefficiently or ineffectively. For example, the network function entity may not have access to current network conditions and/or current positions of SUs in the wireless communication network. Therefore, the network function entity may be unable to determine when a position of an SU and/or when wireless communication channel quality for the SU changes.

Figure 8:
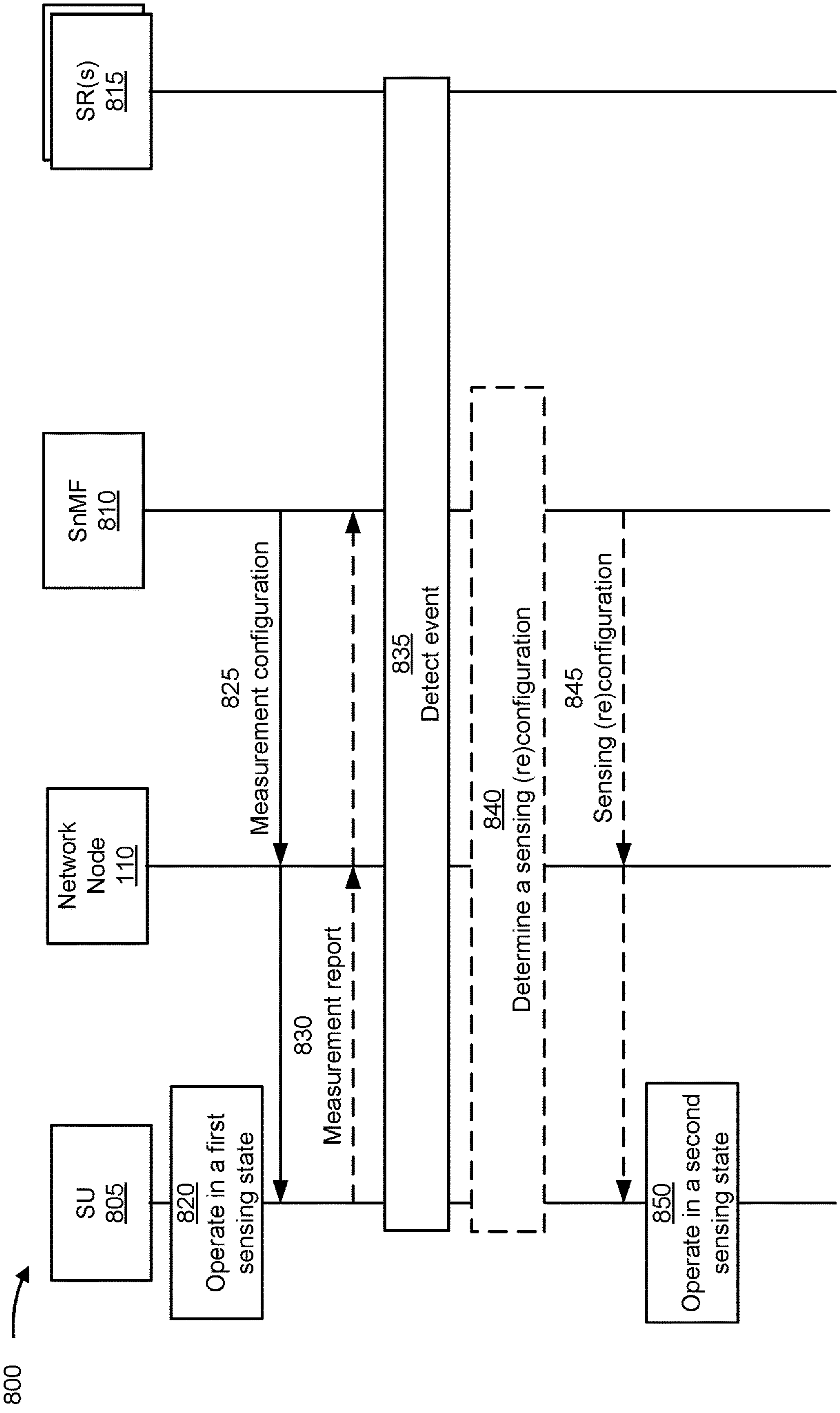
FIG. 8 is a diagram illustrating example operations associated with sensing service adaptive reconfiguration in accordance with the present disclosure.

FIG. 8 is a diagram illustrating example operations 800 associated with sensing service adaptive reconfiguration in accordance with the present disclosure. As shown in FIG. 8, an SU 805, a network node 110, an SnMF entity 810, and one or more SRs 815 may communicate with each other. The SnMF entity 810 and the one or more SRs 815 may communicate via one or more network interfaces. The one or more network interfaces may include wired connections, wireless connections, and/or logical connections. For example, the SnMF entity 810 and the one or more SRs 815 may be network functions of a core network for a wireless communication network, such as the wireless communication network 100 (for example, as described in more detail elsewhere herein). The network node 110 may communicate with the SnMF entity 810 via one or more other network function entities, such as an AMF.

The SU 805 and the network node 110 may be included in the wireless communication network (for example, the wireless communication network 100). The SU 805 may be an SU 160. In some aspects, the SU 805 may be a UE 120, a network node 110, a TRP, an RU, or another wireless communication device that is capable of performing RF sensing, as described in more detail elsewhere herein.

The one or more SRs 815 may be standalone network function entities. In other aspects, the one or more SRs 815 may be included in another network function entity, such as the SnMF entity 810, an AMF, an NRF, or another network function entity. For example, the operation(s) described herein as being performed by or via an SR 815 may be performed by another network function entity, such as the SnMF entity 810, an AMF, an NRF, a UDM or another network function entity. In some aspects, an SR 815 may be a common repository configured to store information for one or more SUs, such as the SU 805. In some aspects, the one or more SRs 815 may include a UE repository (for example, a UE sensing repository, such as the UE sensing repository 715) and/or a network node repository (for example, a TRP sensing repository, such as the TRP sensing repository 720).

In some aspects, prior to the operation(s) depicted in FIG. 8, the SU 805 may register with a sensing service supported by the network. For example, the SU 805 may transmit registration information for the sensing service (for example, for an ISAC service). In some aspects, the SU 805 may initiate a registration with the sensing service. The SU 805 may transmit registration information to register as an SU with the sensing service. The registration information may indicate a location of the SU and/or one or more sensing capabilities of the SU. A network function entity may receive the registration information. For example, the SnMF entity 810, an AMF entity, or another network function entity may store the registration information. In some aspects, an SR 815 may be configured to store registration information for UEs and/or network nodes that have registered as SUs. The SR 815 may be accessible by multiple network functions, such as multiple SnMF entities.

As another example, the SU 805 may transmit a request to associate the SU with a network function configured to perform operations for the sensing service. For example, the SU 805 may transmit a communication (for example, a non-access stratum (NAS) transport communication) indicating a position of the SU 805 and/or one or more sensing capabilities of the SU 805 (for example, indicating registration information of the SU). In some aspects, an AMF entity may identify one or more SnMF entities (for example, the SnMF entity 810) to be associated with the SU 805 using, based on, in response to, or otherwise associated with the registration information.

The one or more sensing capabilities of the SU 805 may include a supported service area, a location of the SU 805 (for example, a geographic location or a cell via which the SU 805 is communicating with the wireless communication network), one or more supported sensing service types, and/or one or more supported QoS parameters for the one or more supported sensing service types, among other examples. For example, the SU 805 may transmit an indication of the location of the SU 805 via geographic coordinates, one or more cell identifiers (for example, one or more physical cell identifiers (PCIs)), one or more tracking areas, one or more geographical areas, and/or one or more areas relative to a position of a given device, among other examples.

A supported sensing service type may include object detection, object tracking, environment monitoring, and/or another type of RF sensing. A supported QoS parameter may indicate one or more supported QoS requirements for a sensing request and/or for a sensing service type supported by the SU 805. A QoS parameter may include a confidence level, an accuracy of one or more sensing parameters (for example, an accuracy of a position estimate, an accuracy of a velocity estimate, or an accuracy of another sensing parameter), a sensing resolution, a sensing service latency (for example, a maximum sensing service latency), a refreshing rate, a missed detection rate, and/or a false alarm rate, among other examples. The SnMF entity 810 and/or the SR 815 may store the registration information for the SU 805 (and/or one or more other SUs configured to operate in the wireless communication network).

A sensing request may originate (for example, be transmitted by) a client device, a network function, or an application function. As used herein, "sensing request" may refer to a request for a sensing service (for example, associated with an ISAC service supported by the wireless communication network). For example, a sensing request may be a request for a given sensing result (for example, object detection, object tracking, environment monitoring, or another sensing type). For example, a sensing request may originate from a client device and/or an application function (for example, via an NEF).

A sensing request may include a sensing area parameter. The sensing area parameter may define an area (for example, a geographical area) in which RF sensing is to be performed. For example, for some use cases of RF sensing, a defined sensing area may improve the relevancy and/or accuracy of provided sensing results. For example, for detection on objects in a certain area, environment monitoring, pedestrian or animal monitoring (for example, on a given roadway or railway), weather monitoring (for example, flood detection), or AGV monitoring in an industrial environment, among other examples, a sensing request may indicate a sensing area in which RF sensing is to be performed. The sensing area parameter may indicate one or more cell identifiers (for example, one or more PCIs), one or more tracking areas, one or more geographical areas, and/or one or more areas relative to a position of a given device (for example, relative to a given UE, network node, or TRP), among other examples.

The sensing request may indicate a sensing service type parameter. The sensing service type parameter may indicate a type of service output expected in response to the sensing request. For example, the sensing service type parameter may indicate that a sensing output is expected to indicate one or more characteristics of an object or environment, such as a position, a micro-Doppler, and/or an object detection, among other examples. The sensing request may indicate a QoS parameter. The QoS parameter may indicate one or more QoS requirements for the sensing request and/or a sensing service type requested by the sensing request. The QoS parameter may indicate a confidence level, an accuracy of one or more sensing parameters (for example, an accuracy of a position estimate, an accuracy of a velocity estimate, or an accuracy of another sensing parameter), a sensing resolution, a sensing service latency (for example, a maximum sensing service latency), a refreshing rate, a missed detection rate, and/or a false alarm rate, among other examples.

The sensing request may indicate a timing parameter. The timing parameter may indicate a duration of requested RF sensing. For example, the timing parameter may indicate an amount of time for which the RF sensing is to be performed. In some aspects, the timing parameter may indicate a start time and/or an end time for the RF sensing. In some aspects, the timing parameter may indicate a periodicity for the RF sensing (for example, the timing parameter may indicate that RF sensing is to be performed each day during certain times). In some aspects, the timing parameter may indicate timing for sensing result reports. For example, the timing parameter may indicate a frequency at which sensing results are to be reported to a client device or network function.

In some aspects, the SU 805 may be configured to operate in one or more sensing states. "Sensing state" may refer to an operational state or status for the sensing service. For example, a sensing state may include a non-registered state, a non-configured state, and/or a configured state, among other examples. The non-registered state may be referred to as a sensing not-registered state. If the SU 805 is operating in the non-registered state, the SU 805 may be capable of performing RF sensing, but the SU 805 may not be registered with the sensing service (for example, the SU 805 may not be a part of the sensing service for the wireless communication network). The non-configured state may also be referred to as a sensing registered state or a registered state. If the SU 805 is operating in the non-configured state, the SU 805 may be registered with the sensing service, but the SU 805 may not be configured with a sensing configuration. For example, the SU 805 may have been discovered and registered by the sensing service (for example, by the SnMF entity 810 and/or the SR 815). However, the SU 805 may not currently have an active or configured sensing configuration for performing one or more RF sensing operations (for example, the SU 805 may not be configured to perform RF sensing). The configured state may also be referred to as a sensing configured state. If the SU 805 is operating in the configured state, the SU 805 may be registered with the sensing service and may have received a sensing configuration. For example, the SU 805 may currently be part of at least one sensing session.

In some aspects, a sensing state of the SU 805 may be based on or otherwise associated with an RRC state of the SU 805 (for example, if the SU 805 is a UE 120). For example, if the network node 110 causes the SU 805 to transition to an RRC idle mode or an RRC inactive mode (for example, from an RRC connected mode), then the SU 805 may switch the sensing state to a non-configured state (for example, if the SU 805 was operating in the configured state). For example, if the network node 110 causes the SU 805 to transition to an idle or inactive state, sensing may be de-configured and/or deactivated in order to improve UE battery savings.

In some other aspects, the SU 805 may maintain a configured state in the RRC idle mode or the RRC inactive mode. For example, the SU 805 may perform RF sensing in the RRC idle mode or the RRC inactive mode. In such examples, the SU 805 may transmit a sensing report to the network node 110 after establishing a communication connection (for example, after transitioning to the RRC connected mode). For example, the SU 805 may transmit collected sensing measurement results upon being connected to the network again. If the network node 110 determines to change the sensing configuration, then the network node 110 may transmit, and the SU 805 may receive, the sensing configuration to be used by the SU 805 (for example, in the idle or inactive state) in an RRC release message.

A sensing session may be associated with multiple sensing configurations (for example, multiple reporting configurations, multiple processing configurations, and/or multiple reference signal configurations). The sensing state may enable all configurations for a sensing state to be modified based on, in response to, or otherwise associated with a change in a sensing operation. This may conserve processing resources, network resources, and/or latency that would have otherwise been associated with separately updating or reconfiguring each configuration associated with the sensing configuration. For example, the sensing state may enable management of multiple configurations that are associated with a sensing session. As an example, if a sensing state indicates that reporting is to be activated or deactivated, then the SU 805 may enable or pause all reporting configurations for the sensing session(s). As another example, if a sensing state indicates that transmitting is to be activated or deactivated, then all reference signal transmissions (for example, configured via one or more reference signal configurations) for the sensing session(s) may be enabled or paused.

In some aspects, the SU 805 may transmit, and the network node 110 may receive, a capability report. The SU 805 may transmit the capability report via capability signaling, an uplink communication, a UE assistance information (UAI) communication, an uplink control information (UCI) communication, an uplink MAC control element (MAC-CE) communication, an RRC communication, a midhaul link communication, a fronthaul link communication, a backhaul link communication, a PUCCH, and/or a PUSCH, among other examples. The capability report may indicate one or more parameters associated with respective capabilities of the SU 805, such as one or more sensing capabilities described elsewhere herein. The one or more parameters may be indicated via respective information elements (IEs) included in the capability report.

The capability report may indicate whether the SU 805 supports a feature and/or one or more parameters related to the feature. For example, the capability report may indicate a capability and/or parameter for adaptive reconfiguration of a sensing state or a sensing configuration. As another example, the capability report may indicate a capability and/or parameter for measuring a link associated with a sensing service (for example, a link via which a signal is to be measured as part of an RF sensing operation) and transmitting a measurement report indicating one or more measurements of the link. One or more operations described herein may be based on capability information of the capabilities report. For example, the SU 805 may perform a communication in accordance with the capability information, may perform an RF sensing operation, or may receive configuration information that is in accordance with the capability information. In some aspects, the capability report may indicate SU support for reconfiguring one or more sensing configurations based on, in response to, or otherwise associated with a change in a sensing state. In some aspects, the capability report may indicate SU support for reconfiguring a sensing configuration or a sensing state based on, in response to, or otherwise associated with detecting an event (for example, that satisfies one or more criteria), as described elsewhere herein (for example, automatically without receiving instructions or a communication to do so from another device).

In a first operation 820, the SU 805 may operate in a first sensing state. For example, the SU 805 may perform one or more operations in accordance with the first sensing state. For example, the SU 805 may perform, in accordance with operating according to a first sensing state, a first set of one or more operations associated with a sensing service. The first set of one or more operations (for example, the first operation 820) may be based on or otherwise associated with the first sensing state.

For example, if the first sensing state is a configured state, then the SU 805 may receive (for example, from the network node 110 and/or the SnMF entity 810) a sensing configuration. For example, the SnMF entity 810 may request the sensing configuration from the network node 110. In such examples, the SnMF entity 810 may transmit the sensing configuration (for example, that is determined by the network node 110) to the one or more SUs (for example, the SU 805) that are selected to fulfill one or more sensing requests, as described in more detail elsewhere herein.

In some aspects, the sensing configuration may include a transmission configuration, one or more measurement configurations, one or more processing configurations, one or more reporting configurations, and/or one or more adaptive reconfiguration configurations, among other examples. The sensing configuration may define how different components of the sensing configuration relate to each other. For example, a processing configuration may indicate which measurements to use (for example, which measurement configuration(s) to use) for processing configured by the processing configuration. As another example, an adaptive reconfiguration configuration may indicate which measurements to use (for example, which measurement configurations to use) for determinations of whether the sensing configuration is to be dynamically adapted or modified. As another example, a processing configuration may indicate how processing results or sensing data is to be reported (for example, which reporting configuration(s) to use to report data that is generated in accordance with the processing configuration).

The transmission configuration may include a configuration for one or more sensing reference signals. For example, the transmission configuration may configure sensing reference signals transmitted by one or more SUs, such as the SU 805. The transmission configuration may include configuration of RF signals, wireless communication signals, OFDM signals, and/or sensing reference signals, among other examples, that are to be used to perform RF sensing operations (for example, in a similar manner as described in connection with FIGS. 4A and 4B).

The one or more measurement configurations indicate, for a sensing reference signal to be measured for the sensing request, one or more time domain resources, one or more frequency domain resources, and/or one or more spatial domain resources. For example, a measurement configuration may define a sensing reference signal to be measured by one or more SUs, such as the SU 805. In some aspects, a measurement configuration may indicate one or more types of measurements to be performed. The one or more types of measurements may include raw channel time domain measurements, frequency domain measurements, and/or angular profile measurements, among other examples. In some aspects, a measurement configuration may include a radio resource management (RRM) measurement configuration. For example, a measurement configuration defined for a reference signal may be configured and used for RF sensing purposes.

The one or more processing configurations may indicate one or more processing outputs of sensing data for the sensing request. For example, the one or more measurement configurations may configure an SU to obtain sensing data (for example, via measurements configured by the one or more measurement configurations). The sensing data may be based on or otherwise associated with wireless communication channel measurements. A processing configuration may define how the sensing data is to be used to determine one or more processing outputs. For example, a processing output may include a parameter that is determined or calculated using sensing data. As an example, a processing output may include a Doppler parameter, a range estimate, a position estimate, a velocity estimate, a radar cross section, an angle map (for example, a Doppler-range map), and/or one or more object detections (for example, a list of one or more Doppler and range of detected targets), among other examples.

A processing configuration may define information for how to process the sensing data (for example, raw sensing measurements). For example, the processing configuration may define one or more parameters to be used for the processing, such as a time/frequency averaging, windowing, and/or one or more algorithms, among other examples. Processing of sensing data may be performed by a UE or a network node 110. In some aspects, the SU 805 may be configured to perform the processing. In other aspects, the SU 805 may be configured to report sensing data and the network node 110 may perform the processing in accordance with a processing configuration. As another example, the SnMF entity 810 may perform the processing of the sensing data.

The same sensing data may be used to generate different processing outputs (for example, defined by different processing configurations). In other words, the same raw measurement may be used to produce multiple different processing outputs. Additionally or alternatively, a single processing output may use multiple sensing data measurements (for example, obtained in accordance with different measurement configurations) to generate a single output. For example, a processing configuration may indicate at least one measurement configuration, of the one or more measurement configurations, associated with the processing configuration. Additionally or alternatively, a processing configuration may indicate at least one reporting configuration, of the one or more reporting configurations, associated with the processing configuration (for example, to define how the processing outputs are to be reported).

The one or more reporting configurations may configure one or more sensing measurement reports. For example, the one or more reporting configurations may indicate time domain and/or frequency domain measurements to be used by the SU 805 to transmit a sensing measurement report. Additionally, the one or more reporting configurations may indicate a timing or periodicity of the sensing measurement reports. In some aspects, the one or more reporting configurations may indicate one or more measurement events associated with transmitting a sensing measurement report. For example, a measurement event, if detected by the SU 805, may trigger the SU 805 to transmit a sensing measurement report. A sensing measurement report may indicate sensing data (for example, channel measurements) and/or one or more processing outputs. For example, a reporting configuration may define what and how to report the (processed) sensing measurements.

The one or more adaptive reconfiguration configurations may indicate one or more adaptive reconfiguration rules. For example, the one or more adaptive reconfiguration configurations may indicate rules for the SU 805 to change a sensing state (for example, the sensing state may include a non-configured state, a configured state, or a non-registered state) or to change the sensing configuration. For example, the one or more adaptive reconfiguration configurations may indicate one or more thresholds to be used to compare to sensing data, processing output, and/or other channel measurements to enable the SU 805 (and/or the network node 110 or the SnMF entity 810) to determine when the sensing state and/or sensing configuration of the SU 805 should be changed. For example, an adaptive reconfiguration configuration may indicate an action to be performed if one or more thresholds are satisfied. The action may include enabling or disabling sensing measurement reporting, de-registering with the sensing service, and/or pausing one or more RF sensing operations, among other examples.

In some aspects, a sensing configuration may be associated with a sensing session. A sensing session may be associated with a sensing session identifier, one or more sets of one or more sensing parameters including the one or more sensing parameters, one or more modes for sensing data reporting, and/or one or more session parameters, among other examples. The sensing session identifier may be unique for each SnMF entity. The one or more sets of one or more sensing parameters may be associated with one or more sensing requests. A sensing session may be associated with multiple sensing configurations.

Establishing a sensing session may enable the network node 110 and/or the SnMF entity 810 to activate, deactivate, configure, de-configure, and/or remove multiple sensing reference signal configurations, multiple sensing report configurations, and/or multiple sensing configurations at the same time. For example, the network node 110 and/or the SnMF entity 810 may indicate an action and the sensing session identifier (for example, a sensing session may be indicated by a simple message carrying the sensing session identifier and indicating the action). This may result in the action being applied for multiple sensing configurations and/or for multiple SUs. This conserves network resources, processing resources, and/or latency, among other examples, that would have otherwise been associated with separately signaling that the action is to be performed for each sensing configuration.

Additionally, a sensing session may facilitate mobility management and/or target tracking when a sensing target is mobile. For example, sensing configuration handover may be simplified because only the sensing session identifier may need to be indicated for a network node 110 to obtain the sensing configuration(s). For example, a UE being handed over to a new network node 110 may be enabled to maintain the sensing configuration(s) associated with the sensing session via the sensing session identifier being indicated as part of the handover operation.

In examples where the first sensing state is the configured state, the first operation 820 may include performing one or more RF sensing operations in accordance with a sensing configuration. For example, the SU 805 may transmit, and the network node 110 and/or the SnMF entity 810 may receive, one or more sensing measurement reports indicating sensing data and/or one or more processing outputs for the sensing service.

In other examples, the first sensing state may be a non-registered state or a non-configured state. In such examples, the first operation 820 may include performing one or more measurements of a wireless communication channel (for example, one or more RRM measurements). For example, an RRM measurement may be a measurement of a wireless communication channel (for example, that is not specific to the sensing service). As an example, the SU 805 may measure the wireless communication channel to obtain information indicative of whether the SU 805 is suitable to perform sensing (for example, whether a position and/or communication channel quality is suitable for an RF sensing operation).

For example, in a second operation 825, the SnMF entity 810 and/or the network node 110 may transmit, and the SU 805 may receive, a measurement configuration. The measurement configuration may be an RRM measurement configuration. For example, the measurement configuration may configure or indicate one or more reference signals (for example, one or more CSI-RSs or synchronization signals) to be measured by the SU 805. In some aspects, the SnMF entity 810 may determine that the SU 805 is to perform and/or report the one or more RRM measurements. In such examples, the SnMF entity 810 may transmit, and the network node 110 may receive, an indication to configure the SU 805 to perform the one or more RRM measurements. For example, the measurement configuration may be an RRC configuration that is determined by the network node 110 using current network conditions (for example, that may not be available to the SnMF entity 810).

For example, the first sensing state may be the registered state. The SnMF entity 810 may identify (for example, discover) the SU 805 as a potential candidate for the sensing service. To evaluate a sensing link quality, the SnMF entity 810 may cause the SU 805 to receive the measurement configuration. For example, before enabling and/or configuring the SU 805 to perform RF sensing, the SnMF entity may determine that the SU 805 is to be configured to perform RRM measurements to assess the sensing link quality.

As another example, the first sensing state may be the configured state. For example, a sensing session or a sensing configuration may be configured for the SU 805. The SnMF entity 810 may determine that the SU 805 is to monitor a quality of a sensing link used for the sensing session or the sensing configuration. For example, the quality may be indicated by RRM measurements, sensing reference signal measurements, sensing data, processing output(s) of sensing data, and/or a position of the SU 805, among other examples. Therefore, the SnMF entity 810 may cause the SU 805 to be configured with the measurement configuration for performing measurements of reference signals (for example, synchronization signal blocks (SSBs), CSI-RSs, tracking reference signals, positioning reference signals, and/or sensing reference signals) to monitor and/or evaluate the quality of the sensing link.

The measurement configuration may configure the SU 805 to perform measurement of a downlink reference signal (for example, if the SU 805 is a UE 120). For example, the measurement configuration may configure the SU 805 to obtain measurement information of one or more CSI-RSs, one or more synchronization signal blocks (SSBs), and/or other reference signals. In some aspects, the measurement configuration may indicate one or more reporting events (for example, one or more measurement events). The one or more reporting events may be defined, or otherwise fixed, by a wireless communication standard. In some examples, the one or more reporting events may be defined for wireless communication channels (for example, not specific to the sensing service), such as a measurement of a signal received from a serving cell satisfying or not satisfying a threshold (for example, an A1 event or an A2 event), or another type of reporting event. In other aspects, the one or more reporting events may be associated with the sensing service. For example, a reporting event (a measurement event) may be configured for, defined for, or otherwise associated with the sensing service.

The SU 805 may be configured to periodically transmit a measurement report indicating measurement information. For example, the SU 805 may be configured (for example, by the network node 110 and/or the SnMF entity 810) to transmit measurement information (for example, RRM measurements and/or sensing measurements) based on, in response to, or otherwise associated with detecting a reporting event (for example, trigger-based measurement reporting). Additionally or alternatively, the SU 805 may be configured (for example, by the network node 110 and/or the SnMF entity 810) to periodically transmit (for example, to the network node 110 and/or the SnMF entity 810) channel state information. For example, the SU 805 may obtain channel state information indicating a time domain and/or frequency domain channel profile.

In some aspects, in a third operation 830, the SU 805 may transmit, and the network node 110 may receive, a measurement report. For example, the measurement report may indicate one or more measurement values of a reference signal transmitted by the network node 110 or another network node or UE. The SU 805 may transmit the measurement report based on, in response to, or otherwise associated with detecting a reporting event (a measurement event). In some aspects, the measurement report may indicate measurement information for a wireless communication channel (for example, may indicate RRM measurement information). In some aspects, the measurement report may be a CSI report. In some aspects, the SU 805 may transmit the measurement report in accordance with a periodic schedule (for example, the measurement report may be a periodic measurement report).

In some aspects, the network node 110 may transmit, and the SnMF entity 810 may receive, the measurement report. For example, the SnMF entity 810 may receive the measurement information (for example, one or more measurement values) indicated by the measurement report that is transmitted by the SU 805 in the third operation 830. In some aspects, the SnMF entity 810 may receive the measurement information directly from the network node 110. In other aspects, the SnMF entity 810 may receive the measurement information from another network function entity, such as an AMF, an SR 815, an NRF, a UDM, or another network function entity. For example, the SnMF entity 810 may receive RRM measurement information obtained by the SU 805 to enable the SnMF entity 810 to assess a sensing link quality of the SU 805. This may improve a determination of the SnMF entity 810 of how and/or when to configure the SU 805 to perform RF sensing.

In some other aspects, the SU 805 may not transmit the measurement report. For example, the SU 805 may be configured to perform one or more measurements (for example, via the measurement configuration in the second operation 825 and/or via a sensing configuration). The SU 805 may monitor and/or evaluate the measurement information to determine if one or more criteria are met (for example, as described elsewhere herein, such as in connection with a fourth operation 835). The SU 805 may adaptively reconfigure (for example, autonomously or automatically without receiving a communication or instructions to do so) a sensing state and/or a sensing configuration of the SU 805 based on, in response to, or otherwise associated with the measurement information.

In some aspects, the measurement information may include RRM measurement information (for example, measurement information of an SSB, a CSI-RS, a tracking reference signal, a positioning reference signal, or another reference signal). In some aspects, the measurement information may include CSI. Additionally or alternatively, the measurement information may include sensing measurement information. The sensing measurement information may include measurements performed or obtained as part of an RF sensing operation. For example, the sensing measurement information may include one or more sensing reference signal measurement values. Additionally or alternatively, the measurement information may indicate a distance between a transmitter and a receiver for an RF sensing operation (for example, a Tx/Rx distance). Additionally or alternatively, the measurement information may include one or more processing outputs of sensing data, such as a target object position, a Doppler measurement, a radar cross section (RCS), or another processing output.

In a fourth operation 835, one or more devices described herein may detect an event (for example, an event that satisfies one or more criteria). In some aspects, the SU 805 may detect the event. Additionally or alternatively, the network node 110 may detect the event. Additionally or alternatively, the SnMF entity 810 may detect the event. Additionally or alternatively, the SR 815 may detect the event. The event may be associated with the measurement information, one or more sensing parameters (for example, a change in sensing parameter(s), a sensing capability of the SU 805, and/or network conditions, among other examples). For example, the fourth operation 835 may include detecting a change in the sensing service, a change in SU sensing capabilities, a change in network conditions, and/or a change in a quality of a sensing link, among other examples.

For example, the SU 805, the network node 110, and/or the SnMF entity 810 may determine that a measurement (for example, indicated by the measurement information) satisfies or does not satisfy a threshold. For example, the one or more criteria may include the threshold (for example, an A1 event threshold or another threshold). For example, the event satisfying one or more criteria may include one or more RRM measurements (obtained by the SU 805 in accordance with the measurement configuration) satisfying a threshold. The one or more RRM measurements may be RSRP measurements of one or more SSBs, one or more CSI-RSs, one or more tracking reference signals, and/or one or more positioning reference signals, among other examples. As another example, the event satisfying the one or more criteria may include one or more measurements of one or more reference signals associated with the sensing service (for example, sensing reference signals) satisfying or not satisfying a threshold (a sensing measurement threshold).

For example, the first sensing state may be a non-registered state or a non-configured state. In such examples, the SU 805, the network node 110, and/or the SnMF entity 810 may determine that a measurement (for example, an RRM measurement) satisfies a threshold. This may be indicative of a sensing link being of suitable quality for the sensing service. As a result, the SnMF entity 810 may determine to configure the SU 805 to perform RF sensing, as described elsewhere herein. As another example, the first sensing state may be a configured state. In such examples, the SU 805, the network node 110, and/or the SnMF entity 810 may determine that a measurement (for example, an RRM measurement or a measurement of a sensing reference signal) does not satisfy a threshold. This may be indicative of a sensing link not being of suitable quality for the sensing service. For example, as a quality of the sensing link changes (as indicated by the measurement information) or a position or Doppler shift of a target object changes, RF sensing results may become more or less reliable. As a result, the SnMF entity 810 may determine to pause or de-configure a sensing session or sensing configuration for the SU 805, as described elsewhere herein.

In some aspects, the fourth operation 835 may include the SU 805, the network node 110, and/or the SnMF entity 810 detecting a change in a sensing environment and/or of a target object for an RF sensing operation. For example, the one more criteria may include a change in a position of a target object, a distance between the SU 805 and the target object satisfying a distance threshold, a change in a Doppler measurement of the target object, a change in an RCS of the target object, and/or a change in another processing output for an RF sensing operation. A change in the sensing environment and/or of a target object for an RF sensing operation may indicate that a sensing state of the SU 805 should be changed. For example, if the distance between the SU 805 and the target object becomes too large, RF sensing results may become unreliable and the SU 805 may switch the sensing state to stop reporting RF sensing information for a sensing session and/or a sensing configuration. As another example, if a Doppler measurement of a target object does not satisfy a threshold (for example, is equal to zero), this may indicate that the target object is not moving and a channel of the sensing link is not changing.

For example, a sensing configuration may indicate one or more reporting events that are based on values of processing output(s), such as a Doppler measurement, a sensor detections (or object detections), a distance to a sensing target (a target object), an angle between the SU 805 and the sensing target, and/or an RCS of the sensing target, among other examples. In the fourth operation 835, the SU 805, the network node 110, and/or the SnMF entity 810 may determine that a value of a processing output satisfies (or does not satisfy) a processing criterion or threshold. As an example, the SU 805 may be configured to transmit a report indicating sensing data or one or more processing outputs if a value of a processing output satisfies a processing criterion or threshold (for example, if a target object has a Doppler measurement that is greater than zero for some amount of time). The SU 805 may be configured to transmit one or more reports indicating that sensing data or one or more processing outputs based on, in response to, or otherwise associated with the value of a processing output satisfies a processing criterion or threshold. The SU 805 may be configured to stop or pause reporting if the value of a processing output does not satisfy a processing criterion or threshold. The SnMF entity 810 may receive an indication that the event has occurred based on, in response to, or otherwise associated with the value of a processing output satisfying (or not satisfying) a processing criterion or threshold. Therefore, the SU 805 may stop or pause reporting of RF sensing information (for example, to conserve power and/or network resources) or the SnMF entity 810 may cause the SU 805 to stop or pause reporting of RF sensing information. Additionally, when the value of the processing output(s) satisfies the processing criterion or threshold, the SU 805 may (or the SnMF entity 810 may cause the SU 805 to) resume reporting of RF sensing information.

As another example, the fourth operation 835 may include the SU 805, the network node 110, and/or the SnMF entity 810 detecting mobility information associated with the SU 805. The mobility information may indicate a position and/or a movement of the SU 805. For example, the network node 110, the SnMF entity 810, and/or the SR 815 may perform a positioning operation to determine a position of the SU 805 based on, in response to, or otherwise associated with detecting the event. For example, the network node 110, the SnMF entity 810, and/or the SR 815 may determine that a measurement value (reported by the SU 805) satisfies a threshold. The network node 110, the SnMF entity 810, and/or the SR 815 may initiate the positioning operation to determine the current position of the SU 805. The positioning operation may be an NR positioning operation. In some aspects, the network node 110, the SnMF entity 810, and/or the SR 815 may obtain positioning information of the SU 805 from another network function entity, such as the AMF or a location management function (LMF), among other examples. For example, the one or more criteria may be based on or otherwise associated with a position of the SU 805 or a distance between the SU 805 and a target object or sensing area. Therefore, the positioning information may enable the network node 110, the SnMF entity 810, and/or the SR 815 to obtain current and/or more accurate information of the position of the SU 805.

Additionally or alternatively, the mobility information may include handover information. For example, the network node 110, the SnMF entity 810, and/or the SR 815 may determine that the SU 805 has changed serving cells (for example, been handed over to a new cell). A handover or change in serving cell may indicate that the SU 805 has changed geographic position. As another example, the mobility information may indicate a change in a sensing area supported by the SU 805. As another example, the mobility information may indicate a change in a service area (for example, supported by the SnMF entity 810).

As another example, the fourth operation 835 may include the SU 805, the network node 110, and/or the SnMF entity 810 detecting a change in one or more sensing capabilities of the SU 805. For example, the SU 805, the network node 110, and/or the SnMF entity 810 may detect a change in an antenna configuration, a transmit power configuration, and/or another configuration of the SU 805. As another example, the SU 805, the network node 110, and/or the SnMF entity 810 may detect a change in a battery level of the SU 805, a location of the SU 805, and/or a processing power of the SU 805, among other examples. For example, the SU 805 may indicate that the battery level of the SU 805 does not satisfy a battery threshold (for example, indicating low battery level). This may indicate that the SU 805 should stop performing RF sensing to conserve power. As another example, the SU 805 may indicate one or more geographic areas or locations in which RF sensing cannot be performed. The SU 805, the network node 110, and/or the SnMF entity 810 may detect that the SU 805 the position of the SU 805 is in a geographic area or location in which RF sensing cannot be performed. As another example, the SU 805 may indicate that the processing power of the SU 805 does not satisfy a processing power threshold. This may indicate that the SU 805 does not have enough processing capacity to support RF sensing. The processing capacity may be indicated via a speed of a processor (for example, a central processing unit) and/or a quantity of operations that the processor can perform in a given amount of time (for example, indicated in terms of megahertz or gigahertz, referring to clock speed, which is an ability of the processor to cycle through operations over time), among other examples.

As another example, the fourth operation 835 may include the SU 805, the network node 110, and/or the SnMF entity 810 detecting a change in network conditions (for example, of the network node 110 and/or a TRP). For example, the SU 805, the network node 110, and/or the SnMF entity 810 may detect a change in an antenna configuration, a power, a bandwidth configuration, a frequency configuration, and/or a network load, among other examples, of the network node 110. As another example, the SU 805, the network node 110, and/or the SnMF entity 810 may detect a change in a current network load. For example, if the network is overloaded (as indicated by the change in the current network load), the SnMF entity may reduce QoS parameters for the sensing service to lower the network overhead used to transmit sensing signals and/or transmit sensing reports. As another example, the SU 805, the network node 110, and/or the SnMF entity 810 may detect a change in a network slicing configuration for the network.

As another example, the fourth operation 835 may include the SU 805, the network node 110, and/or the SnMF entity 810 detecting a change in the sensing service. For example, the SnMF entity 810 may receive an indication of an initiation, a termination, and/or a change in a sensing request. Additionally or alternatively, the SnMF entity 810 may determine that one or more sensing parameters for the sensing request have been changed, such as one or more QoS parameters, one or more reporting parameters, and/or another sensing parameter. For example, the SnMF entity 810 may receive, from a client device or another network function (such as an AMF), an indication of the change in the sensing service.

In some aspects, the fourth operation 835 may include the SnMF entity 810 receiving an indication that the event has occurred. For example, the SU 805, the network node 110, and/or the SR 815 may detect the event that satisfies the one or more criteria. In some aspects, the SU 805, the network node 110, and/or the SR 815 may transmit, and the SnMF entity 810 may receive, an indication that the event has occurred. This may enable the SnMF entity 810 to determine a change in a sensing state, a sensing session, and/or a sensing configuration for the SU 805.

For example, in a fifth operation 840, the SnMF entity 810 may determine a sensing configuration or a sensing reconfiguration for the SU 805. The SnMF entity 810 may determine the sensing configuration or the sensing reconfiguration based on, in response to, or otherwise associated with detecting or receiving an indication that the event has occurred (for example, in the fourth operation 835). The SnMF entity 810 may determine the sensing configuration or the sensing reconfiguration based on, in response to, or otherwise associated with the event.

For example, if the event indicates that a measurement (for example, an RRM measurement) performed by the SU 805 satisfies a threshold, then the SnMF entity 810 may determine a sensing configuration for the SU 805. For example, the first sensing state (that the SU 805 is operating in as described with respect to the first operation 820) may be a non-configured state. If the measurement (for example, an RRM measurement) performed by the SU 805 satisfies a threshold, then the SnMF entity 810 may determine that the SU 805 is to be configured to perform RF sensing. Therefore, the SnMF entity 810 may determine a sensing configuration (or one or more sensing parameters for the network node 110 to determine the sensing configuration) for the SU 805.

As another example, the first sensing state may be a configured state. In the fifth operation 840, the SnMF entity 810 may determine that the SU 805 is to pause RF sensing operation or switch to a non-configured state. For example, the event may indicate that a measurement (for example, an RRM measurement or a measurement of a sensing reference signal) performed by the SU 805 does not satisfy a threshold, thereby indicating that a sensing link used by the SU 805 has poor quality. As another example, the event may indicate that a sensing capability of the SU 805 has changed such that the SU 805 no longer supports the RF sensing operation. As another example, the event may indicate that a position of the SU 805 has changed such that the SU 805 is no longer near a sensing area or that a distance between the SU 805 and a target object is large. As another example, the event may indicate a change in a network condition such that the RF sensing operation should no longer be performed, as described elsewhere herein. As a result, in the fifth operation 840, the SnMF entity 810 may determine that the sensing session or the sensing configuration for the SU 805 is to be paused or terminated.

In a sixth operation 845, the SnMF entity 810 may transmit, and the network node 110 and/or the SU 805 may receive, an indication of the sensing configuration or the sensing reconfiguration. In some aspects, the SnMF entity 810 may transmit, and the network node 110 may receive, an indication of one or more sensing parameters and/or an indication to modify the sensing session, sensing state, or sensing configuration of the SU 805. In such examples, the network node 110 may determine the sensing configuration (for example, an RRC configuration) to configure the one or more sensing parameters and/or the modification of the sensing session, sensing state, or sensing configuration for the SU 805. For example, the network node 110 may transmit, and the SU 805 may receive, an RRC communication indicating the sensing configuration or the sensing reconfiguration.

In some aspects, such as when the SU 805 changes from a configured state to a non-configured state, the SU 805, the network node 110, and/or the SnMF entity 810 may cause the SU 805 to pause or terminate one or more RF sensing operations (such as transmitting measurement reports indicating sensing data or processing output(s) of sensing data). However, the SU 805 may continue to perform some measurements (for example, trigger-based measurements) of a wireless communication channel, in a similar manner as described elsewhere herein (such as in connection with the second operation 825 and/or the third operation 830). For example, the SU 805, the network node 110, and/or the SnMF entity 810 may determine to change a sensing configuration to stop or pause measurement and/or reporting of periodic channel profiles, while maintaining the trigger-based RSRP reports to monitor a sensing link. If another event is detected (for example, in a similar manner as described in connection with the fourth operation 835), then the SU 805 may be (re) configured with a sensing configuration (for example, if the quality of the sensing link improves, then the SU 805 may be (re) configured to perform RF sensing).

In some other aspects, the SnMF entity 810 may not receive the indication that the event has occurred. Instead, the SU 805 and/or the network node 110 may be configured with one or more adaptive reconfiguration rules. The adaptive reconfiguration rule(s) may indicate how the network node 110 and/or the SU 805 are to modify or change a sensing state, a sensing session, and/or a sensing configuration for the SU 805 based on, in response to, or otherwise associated with detecting that the event has occurred. The network node 110 may transmit, and the SU 805 may receive, configuration information indicating the one or more adaptive reconfiguration rules (for example, via an RRC configuration). For example, if the event indicates that a measurement (performed by the SU 805) satisfies a threshold, then the SU 805 may (or the network node 110 may cause the SU 805 to) start or resume performing one or more RF sensing operations in accordance with a sensing configuration (for example, an adaptive reconfiguration rule may indicate that if a measurement satisfies a threshold, then RF sensing operations are to be started or resumed). For example, in a seventh operation 850, the SU 805 may operate in a second sensing state based on, in response to, or otherwise associated with receiving an indication from the SnMF entity 810 and/or applying one or more adaptive reconfiguration rules.

For example, the SU 805 may obtain an indication to switch the first sensing state to a second sensing state (for example, in association with an event satisfying one or more criteria as described in connection with the fourth operation 835). The SU 805 obtaining the indication to switch the sensing state may include receiving a communication indicating that the sensing state is to be switched (for example, from the network node 110 or the SnMF entity 810). In other aspects, the SU 805 obtaining the indication to switch the sensing state may include detecting the event (for example, in the fourth operation 835). For example, the SU 805 obtaining the indication to switch the sensing state may be based on, in response to, or otherwise associated with detecting the event and/or applying one or more adaptive reconfiguration rules using information associated with the event.

The switch of the first sensing state to the second sensing state may cause a modification of a sensing configuration for the SU associated with the sensing service. For example, in the seventh operation 850, the SU 805 may operate in a configured state. In such examples, the event may be associated with a quality of a sensing link improving, a position of the SU 805 being closer to a sensing area or target object, and/or a sensing capability of the SU 805 changing such that the SU 805 now supports RF sensing, among other examples described herein.

In some aspects, the SU 805 may switch from the non-configured state to the configured state (for example, in response to a communication from the network node 110 or the SnMF entity 810, or automatically by applying an adaptive reconfiguration rule) based on, in response to, or otherwise associated with a measurement satisfying a threshold, a processing output satisfying a processing criterion or threshold, a position of the SU 805 changing, a parameter of the sensing service or a sensing request changing, and/or another event.

In other examples, in the seventh operation 850, the SU 805 may operate in a non-configured state. In such examples, the event may be associated with a quality of a sensing link degrading, a position of the SU 805 being further from a sensing area or target object, and/or a sensing capability of the SU 805 changing such that the SU 805 no longer supports RF sensing, among other examples described herein. For example, the SU 805 may switch from the configured state to the non-configured state (or the non-registered state) (for example, in response to a communication from the network node 110 or the SnMF entity 810 or automatically by applying an adaptive reconfiguration rule) based on, in response to, or otherwise associated with a measurement not satisfying a threshold, a processing output not satisfying a processing criterion or threshold, a position of the SU 805 changing, a parameter of the sensing service or a sensing request changing, and/or another event.

The SU 805 may adaptively change between sensing states based on, in response to, or otherwise associated with the detection of events, as described herein. For example, a switch or change from the configured state to the non-configured state (or the non-registered state) may cause the SU 805 to pause, stop, or terminate one or more RF sensing operations, such as transmitting a measurement report, performing RF sensing measurements, or another RF sensing operation. A switch or change from the non-configured state to the configured state may cause the SU 805 to start or resume one or more RF sensing operations. As a result, the SU 805 may perform RF sensing operations in accordance with current network conditions, current link quality, and/or current sensing capabilities, among other examples. This may improve an efficiency and/or performance of the RF sensing operations.

Figure 9:
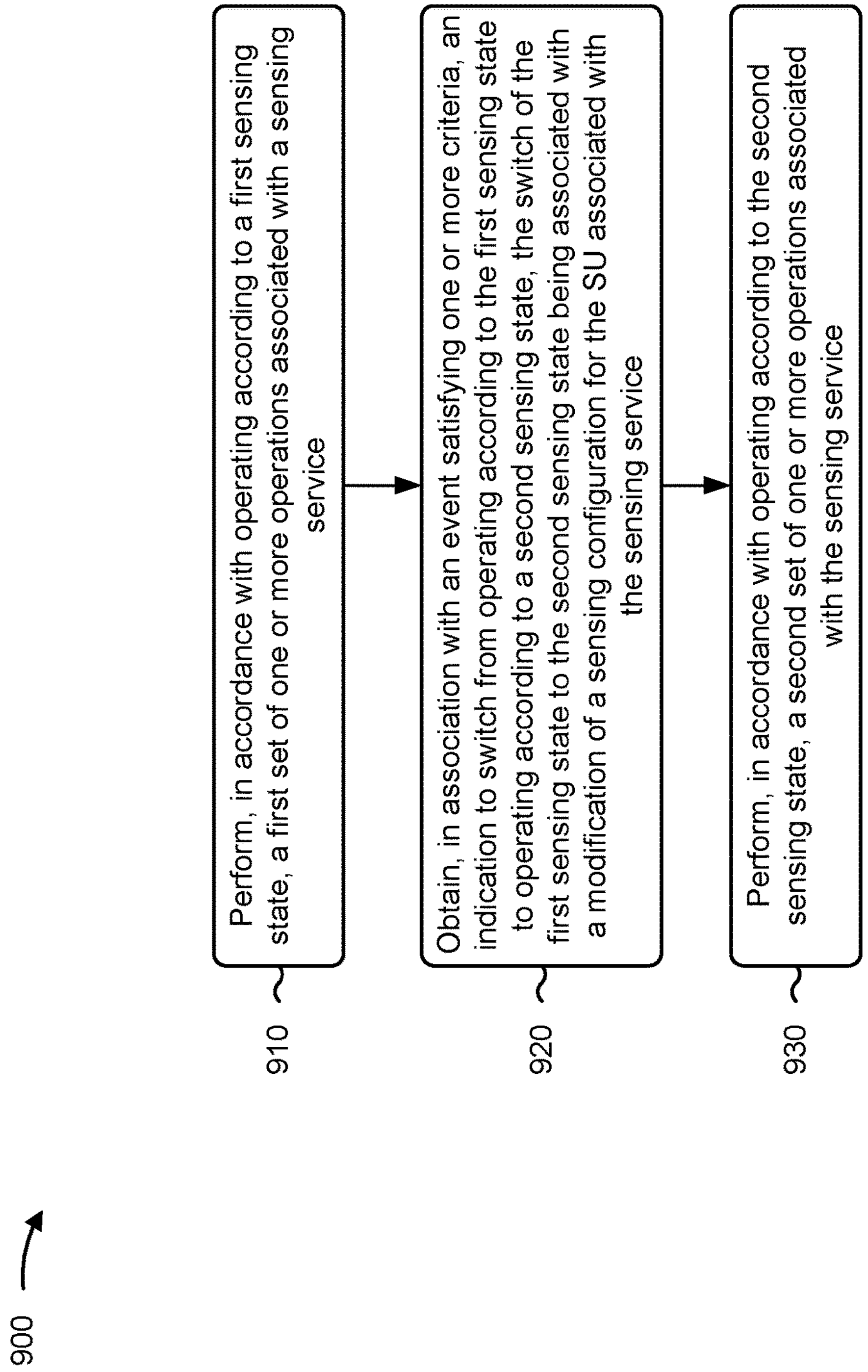
FIG. 9 is a flowchart illustrating an example process performed, for example, at a sensing unit (SU) or an apparatus of an SU that supports sensing service adaptive reconfiguration in accordance with the present disclosure.

FIG. 9 is a flowchart illustrating an example process 900 performed, for example, at an SU or an apparatus of an SU that supports sensing service adaptive reconfiguration in accordance with the present disclosure. Example process 900 is an example where the apparatus or the SU (for example, the SU 160 or the SU 805) performs operations associated with sensing service adaptive reconfiguration.

As shown in FIG. 9, in some aspects, process 900 may include performing, in accordance with operating according to a first sensing state, a first set of one or more operations associated with a sensing service (block 910). For example, the SU (such as by using communication manager 1108 or performing component 1110, depicted in FIG. 11) may perform, in accordance with operating according to a first sensing state, a first set of one or more operations associated with a sensing service, as described above.

As further shown in FIG. 9, in some aspects, process 900 may include obtaining, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service (block 920). For example, the SU (such as by using communication manager 1108, reception component 1102, or measurement component 1112, depicted in FIG. 11) may obtain, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service, as described above.

As further shown in FIG. 9, in some aspects, process 900 may include performing, in accordance with operating according to the second sensing state, a second set of one or more operations associated with the sensing service (block 930). For example, the SU (such as by using communication manager 1108 or performing component 1110, depicted in FIG. 11) may perform, in accordance with operating according to the second sensing state, a second set of one or more operations associated with the sensing service, as described above.

Process 900 may include additional aspects, such as any single aspect or any combination of aspects described below or in connection with one or more other processes described elsewhere herein.

In a first additional aspect, the first sensing state is a non-registered state or a non-configured state, the second sensing state is a configured state associated with the sensing configuration being configured for the SU, and performing the first set of one or more operations includes transmitting a measurement report indicating one or more RRM measurements, where the event satisfying the one or more criteria includes the one or more RRM measurements satisfying a threshold.

In a second additional aspect, alone or in combination with the first aspect, obtaining the indication to switch the first sensing state to the second sensing state includes receiving configuration information indicating the sensing configuration.

In a third additional aspect, alone or in combination with one or more of the first and second aspects, process 900 includes receiving configuration information for the one or more RRM measurements indicating one or more reference signal configurations for the one or more RRM measurements.

In a fourth additional aspect, alone or in combination with one or more of the first through third aspects, the first sensing state is a configured state associated with the sensing configuration being configured for the SU, the second sensing state is a non-configured state, and performing the first set of one or more operations includes transmitting a first measurement report indicating one or more measurements of one or more reference signals associated with the sensing service, where the event satisfying the one or more criteria includes the one or more measurements not satisfying a first threshold.

In a fifth additional aspect, alone or in combination with one or more of the first through fourth aspects, process 900 includes receiving configuration information for a reference signal configuration for one or more reference signals and a reporting configuration for the first measurement report.

In a sixth additional aspect, alone or in combination with one or more of the first through fifth aspects, the one or more reference signals include at least one of one or more RRM reference signals, or one or more sensing reference signals. The one or more RRM reference signals may include an SSB, a CSI-RS, a tracking reference signal, and/or a positioning reference signal, among other examples.

In a seventh additional aspect, alone or in combination with one or more of the first through sixth aspects, the one or more measurements indicate a position of the SU, and the event satisfying the one or more criteria includes a distance between the position of the SU and a sensing area or a sensing target of the sensing configuration satisfying a distance threshold.

In an eighth additional aspect, alone or in combination with one or more of the first through seventh aspects, obtaining the indication to switch the first sensing state to the second sensing state includes obtaining an indication to de-configure or pause the sensing configuration.

In a ninth additional aspect, alone or in combination with one or more of the first through eighth aspects, performing the second set of one or more operations includes transmitting a second measurement report indicating one or more RRM measurements.

In a tenth additional aspect, alone or in combination with one or more of the first through ninth aspects, process 900 includes receiving an indication to switch the second sensing state to the first sensing state in association with the one or more RRM measurements satisfying a second threshold, and performing, in accordance with the second sensing state, a third one or more operations for the sensing configuration or another sensing configuration.

In an eleventh additional aspect, alone or in combination with one or more of the first through tenth aspects, process 900 includes refraining from performing a third one or more operations for the sensing configuration, and transmitting, in association with switching the first sensing state to the second sensing state, an indication that the sensing configuration has been paused.

In a twelfth additional aspect, alone or in combination with one or more of the first through eleventh aspects, the event is associated with one or more processing outputs of the sensing configuration.

In a thirteenth additional aspect, alone or in combination with one or more of the first through twelfth aspects, the one or more processing outputs include at least one of one or more Doppler measurements, one or more sensor detections, a distance to a sensing target, an angle between the SU and the sensing target, or a radar cross section of the sensing target.

In a fourteenth additional aspect, alone or in combination with one or more of the first through thirteenth aspects, the event is associated with one or more configurations of the SU.

In a fifteenth additional aspect, alone or in combination with one or more of the first through fourteenth aspects, the one or more configurations include at least one of an antenna configuration, a transmit power configuration, a bandwidth configuration, a frequency configuration, or a network load.

In a sixteenth additional aspect, alone or in combination with one or more of the first through fifteenth aspects, the event satisfying the one or more criteria includes a change in the one or more configurations, and process 900 includes transmitting an indication of the change in the one or more configurations.

In a seventeenth additional aspect, alone or in combination with one or more of the first through sixteenth aspects, process 900 includes transmitting an indication of the one or more criteria.

In an eighteenth additional aspect, alone or in combination with one or more of the first through seventeenth aspects, the one or more criteria include at least one of a battery level of the SU, a location of the SU, or a processing capacity of the SU.

In a nineteenth additional aspect, alone or in combination with one or more of the first through eighteenth aspects, the event is associated with one or more RRM measurements.

In a twentieth additional aspect, alone or in combination with one or more of the first through nineteenth aspects, the event is associated with one or more sensing reference signal measurements.

In a twenty-first additional aspect, alone or in combination with one or more of the first through twentieth aspects, the event is associated with a distance between the SU and a network node or between the SU and a sensing target of the sensing configuration.

In a twenty-second additional aspect, alone or in combination with one or more of the first through twenty-first aspects, the event is associated with a sensing parameter of a sensing target of the sensing configuration.

In a twenty-third additional aspect, alone or in combination with one or more of the first through twenty-second aspects, the event is associated with at least one of a handover of the SU, a change in a sensing area of the sensing configuration, or a change in a service area of the SU.

In a twenty-fourth additional aspect, alone or in combination with one or more of the first through twenty-third aspects, the event is associated with a change in a capability of the SU.

In a twenty-fifth additional aspect, alone or in combination with one or more of the first through twenty-fourth aspects, the event is associated with a change in one or more network condition parameters.

In a twenty-sixth additional aspect, alone or in combination with one or more of the first through twenty-fifth aspects, the event is associated with a change in one or more parameters of the sensing service.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
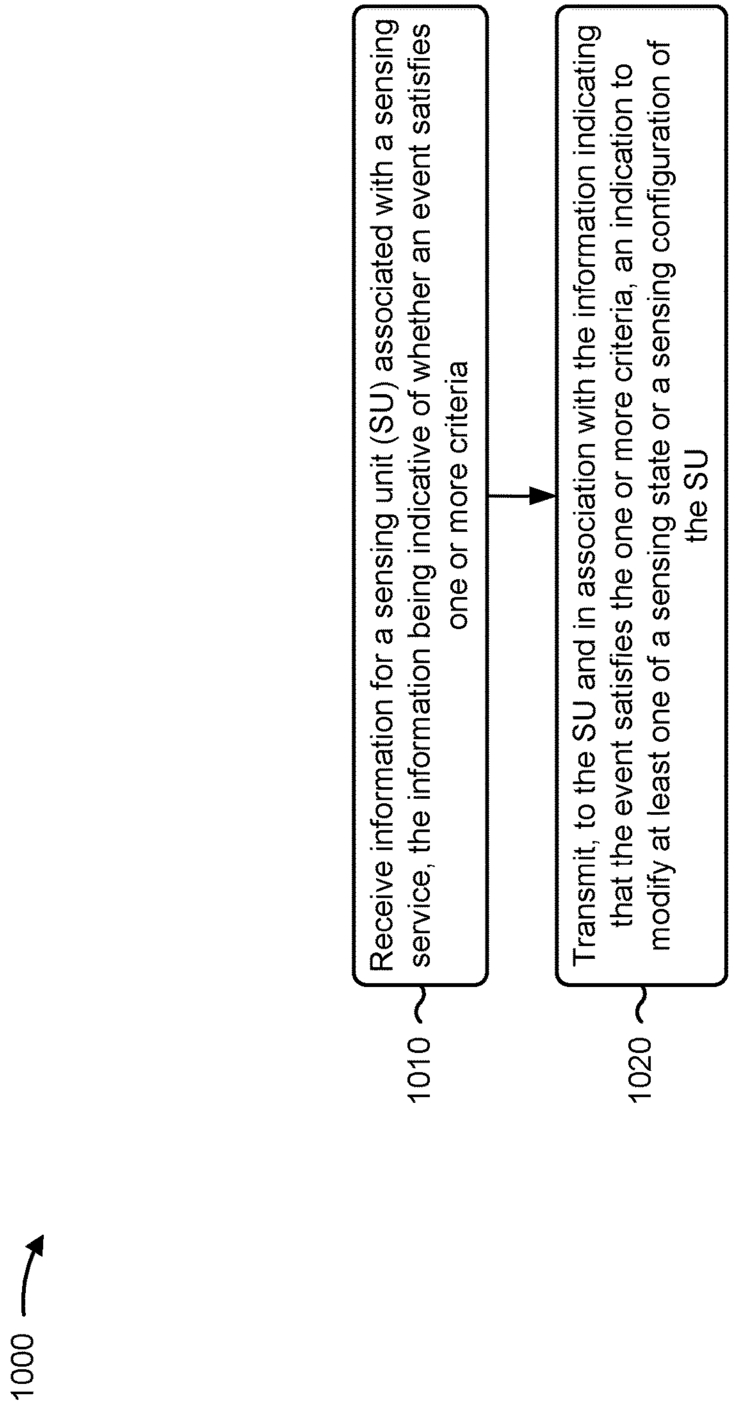
FIG. 10 is a flowchart illustrating an example process performed, for example, at an SnMF entity or an apparatus of an SnMF entity that supports sensing service adaptive reconfiguration in accordance with the present disclosure.

FIG. 10 is a flowchart illustrating an example process 1000 performed, for example, at an SnMF entity or an apparatus of an SnMF entity that supports sensing service adaptive reconfiguration in accordance with the present disclosure. Example process 1000 is an example where the apparatus or the SnMF (for example, the network node 170 or the SnMF entity 810) performs operations associated with sensing service adaptive reconfiguration.

As shown in FIG. 10, in some aspects, process 1000 may include receiving information for an SU associated with a sensing service, the information being indicative of whether an event satisfies one or more criteria (block 1010). For example, the SnMF entity (such as by using communication manager 1208 or reception component 1202, depicted in FIG. 12) may receive information for an SU associated with a sensing service, the information being indicative of whether an event satisfies one or more criteria, as described above.

As further shown in FIG. 10, in some aspects, process 1000 may include transmitting, to the SU and in association with the information indicating that the event satisfies the one or more criteria, an indication to modify at least one of a sensing state or a sensing configuration of the SU (block 1020). For example, the SnMF (such as by using communication manager 1208 or transmission component 1204, depicted in FIG. 12) may transmit, to the SU and in association with the information indicating that the event satisfies the one or more criteria, an indication to modify at least one of a sensing state or a sensing configuration of the SU, as described above.

Process 1000 may include additional aspects, such as any single aspect or any combination of aspects described below or in connection with one or more other processes described elsewhere herein.

In a first additional aspect, the sensing state is a non-registered state or a non-configured state, and process 1000 includes receiving a measurement report indicating one or more RRM measurements, where the event satisfying the one or more criteria includes the one or more RRM measurements satisfying a threshold.

In a second additional aspect, alone or in combination with the first aspect, transmitting the indication to modify at least one of the sensing state or the sensing configuration of the SU includes transmitting configuration information indicating the sensing configuration.

In a third additional aspect, alone or in combination with one or more of the first and second aspects, process 1000 includes transmitting configuration information for the one or more RRM measurements indicating one or more reference signal configurations for the one or more RRM measurements.

In a fourth additional aspect, alone or in combination with one or more of the first through third aspects, the sensing state is a configured state associated with the sensing configuration being configured for the SU, the indication to modify at least one of the sensing state or the sensing configuration of the SU indicates that the sensing state is to be switched to a non-configured state, and process 1000 includes receiving a first measurement report indicating one or more measurements of one or more reference signals associated with the sensing service, where the event satisfying the one or more criteria includes the one or more measurements not satisfying a first threshold.

In a fifth additional aspect, alone or in combination with one or more of the first through fourth aspects, process 1000 includes transmitting configuration information for a reference signal configuration for one or more reference signals and a reporting configuration for the first measurement report.

In a sixth additional aspect, alone or in combination with one or more of the first through fifth aspects, the one or more reference signals include at least one of one or more RRM reference signals, or one or more sensing reference signals.

In a seventh additional aspect, alone or in combination with one or more of the first through sixth aspects, the one or more measurements indicate a position of the SU, and the event satisfying the one or more criteria includes a distance between the position of the SU and a sensing area or a sensing target of the sensing configuration satisfying a distance threshold.

In an eighth additional aspect, alone or in combination with one or more of the first through seventh aspects, transmitting the indication to modify at least one of the sensing state or the sensing configuration of the SU includes receiving an indication to de-configure or pause the sensing configuration.

In a ninth additional aspect, alone or in combination with one or more of the first through eighth aspects, process 1000 includes receiving a second measurement report indicating one or more RRM measurements.

In a tenth additional aspect, alone or in combination with one or more of the first through ninth aspects, transmitting the indication to modify at least one of the sensing state or the sensing configuration of the SU includes transmitting an indication to switch the sensing state back to the configured state in association with the one or more RRM measurements satisfying a second threshold.

In an eleventh additional aspect, alone or in combination with one or more of the first through tenth aspects, process 1000 includes receiving an indication that the SU has paused the sensing configuration.

In a twelfth additional aspect, alone or in combination with one or more of the first through eleventh aspects, the event is associated with one or more processing outputs of the sensing configuration.

In a thirteenth additional aspect, alone or in combination with one or more of the first through twelfth aspects, the one or more processing outputs include at least one of one or more Doppler measurements, one or more sensor detections, a distance to a sensing target, an angle between the SU and the sensing target, or a radar cross section of the sensing target.

In a fourteenth additional aspect, alone or in combination with one or more of the first through thirteenth aspects, the event is associated with one or more configurations of the SU.

In a fifteenth additional aspect, alone or in combination with one or more of the first through fourteenth aspects, the one or more configurations include at least one of an antenna configuration, a transmit power configuration, a bandwidth configuration, a frequency configuration, or a network load.

In a sixteenth additional aspect, alone or in combination with one or more of the first through fifteenth aspects, the event satisfying the one or more criteria includes a change in the one or more configurations, process 1000 includes receiving an indication of the change in the one or more configurations.

In a seventeenth additional aspect, alone or in combination with one or more of the first through sixteenth aspects, process 1000 includes receiving an indication of the one or more criteria.

In an eighteenth additional aspect, alone or in combination with one or more of the first through seventeenth aspects, the one or more criteria include at least one of a battery level of the SU, a location of the SU, or a processing capacity of the SU.

In a nineteenth additional aspect, alone or in combination with one or more of the first through eighteenth aspects, the event is associated with one or more RRM measurements.

In a twentieth additional aspect, alone or in combination with one or more of the first through nineteenth aspects, the event is associated with one or more sensing reference signal measurements.

In a twenty-first additional aspect, alone or in combination with one or more of the first through twentieth aspects, the event is associated with a distance between the SU and a network node or between the SU and a sensing target of the sensing configuration.

In a twenty-second additional aspect, alone or in combination with one or more of the first through twenty-first aspects, the event is associated with a sensing parameter of a sensing target of the sensing configuration.

In a twenty-third additional aspect, alone or in combination with one or more of the first through twenty-second aspects, the event is associated with at least one of a handover of the SU, a change in a sensing area of the sensing configuration, or a change in a service area of the SU.

In a twenty-fourth additional aspect, alone or in combination with one or more of the first through twenty-third aspects, the event is associated with a change in a capability of the SU.

In a twenty-fifth additional aspect, alone or in combination with one or more of the first through twenty-fourth aspects, the event is associated with a change in one or more network condition parameters.

In a twenty-sixth additional aspect, alone or in combination with one or more of the first through twenty-fifth aspects, the event is associated with a change in one or more parameters of the sensing service.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
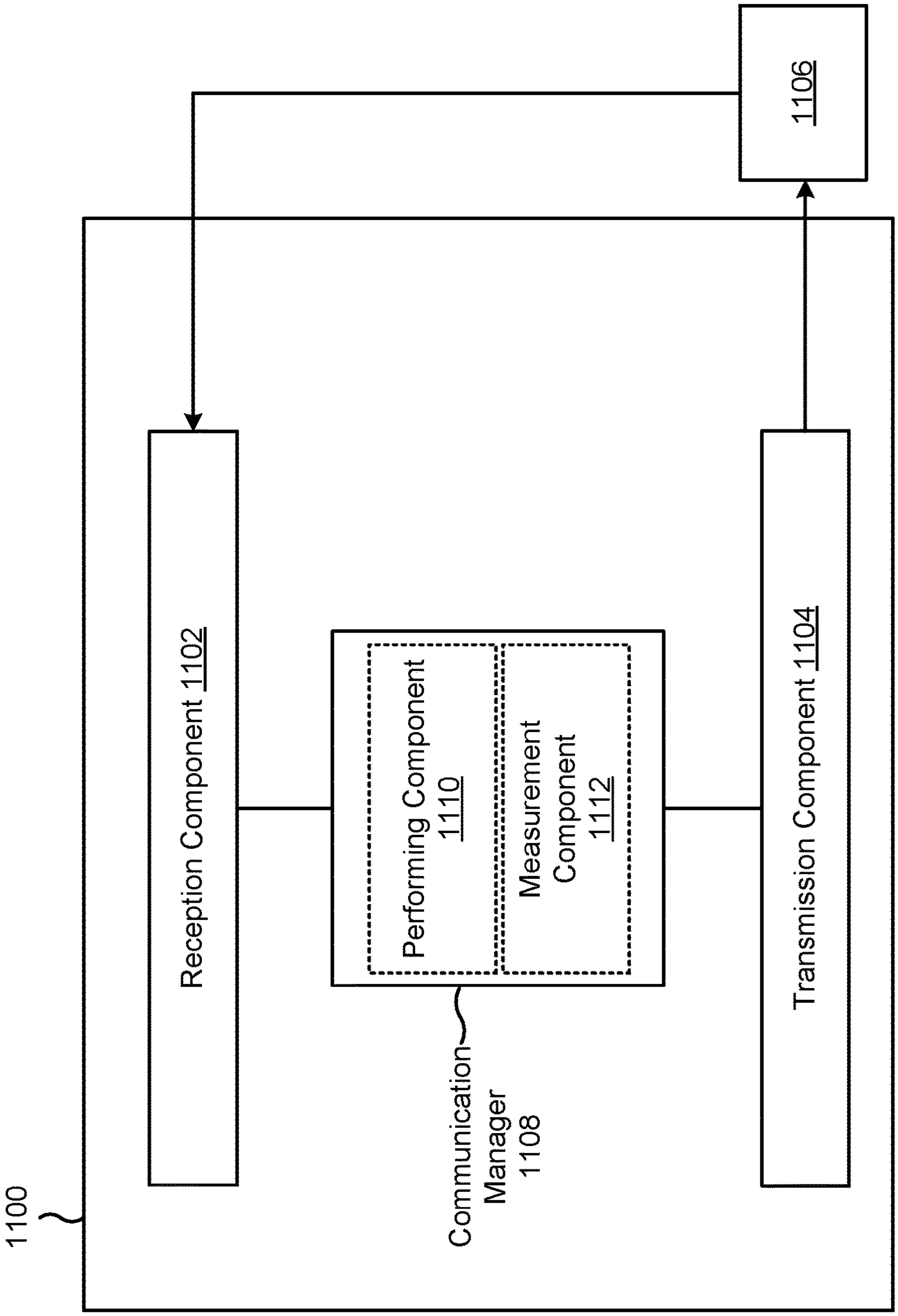
FIG. 11 is a diagram of an example apparatus for wireless communication that supports sensing service adaptive reconfiguration in accordance with the present disclosure.

FIG. 11 is a diagram of an example apparatus 1100 for wireless communication that supports sensing service adaptive reconfiguration in accordance with the present disclosure. The apparatus 1100 may be a SU, or a SU may include the apparatus 1100. In some aspects, the apparatus 1100 includes a reception component 1102, a transmission component 1104, and a communication manager 1108, which may be in communication with one another (for example, via one or more buses). The communication manager 1108 may be, or may be similar to, other communication managers described herein, such as the communication manager 140 or the communication manager 150. As shown, the apparatus 1100 may communicate with another apparatus 1106 (such as a UE, a network node, or another wireless communication device) using the reception component 1102 and the transmission component 1104.

In some aspects, the apparatus 1100 may be configured to and/or operable to perform one or more operations described herein in connection with FIG. 8. Additionally or alternatively, the apparatus 1100 may be configured to and/or operable to perform one or more processes described herein, such as process 900 of FIG. 9. In some aspects, the apparatus 1100 may include one or more components of the UE or the network node described above in connection with FIG. 2.

The reception component 1102 may receive communications, such as reference signals, control information, and/or data communications, from the apparatus 1106. The reception component 1102 may provide received communications to one or more other components of the apparatus 1100, such as the communication manager 1108. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, one or more modems, one or more demodulators, one or more MIMO detectors, one or more receive processors, one or more controllers/processors, and/or one or more memories of the UE or the network node described above in connection with FIG. 2.

The transmission component 1104 may transmit communications, such as reference signals, control information, and/or data communications, to the apparatus 1106. In some aspects, the communication manager 1108 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, one or more modems, one or more modulators, one or more transmit MIMO processors, one or more transmit processors, one or more controllers/processors, and/or one or more memories of the UE or the network node described above in connection with FIG. 2. In some aspects, the transmission component 1104 may be co-located with the reception component 1102 in one or more transceivers.

The communication manager 1108 may perform, in accordance with operating according to a first sensing state, a first set of one or more operations associated with a sensing service. The communication manager 1108 may obtain, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service. The communication manager 1108 may perform, in accordance with operating according to the second sensing state, a second set of one or more operations associated with the sensing service. In some aspects, the communication manager 1108 may perform one or more operations described elsewhere herein as being performed by one or more components of the communication manager 1108.

The communication manager 1108 may include one or more controllers/processors, one or more memories, one or more schedulers, and/or one or more communication units of the UE or the network node described above in connection with FIG. 2. In some aspects, the communication manager 1108 includes a set of components, such as a performing component 1110, and/or a measurement component 1112. Alternatively, the set of components may be separate and distinct from the communication manager 1108. In some aspects, one or more components of the set of components may include or may be implemented within one or more controllers/processors, one or more memories, one or more schedulers, and/or one or more communication units of the UE or the network node described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The performing component 1110 may perform, in accordance with operating according to a first sensing state, a first set of one or more operations associated with a sensing service. The reception component 1102 and/or the measurement component 1112 may obtain, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service. The performing component 1110 may perform, in accordance with operating according to the second sensing state, a second set of one or more operations associated with the sensing service.

The reception component 1102 may receive configuration information for the one or more RRM measurements indicating one or more reference signal configurations for the one or more RRM measurements.

The reception component 1102 may receive configuration information for a reference signal configuration for one or more reference signals and a reporting configuration for the first measurement report.

The reception component 1102 may receive an indication to switch the second sensing state to the first sensing state in association with the one or more RRM measurements satisfying a second threshold.

The performing component 1110 may perform, in accordance with the second sensing state, a third one or more operations for the sensing configuration or another sensing configuration.

The refraining component 1110 may refrain from performing a third one or more operations for the sensing configuration.

The transmission component 1104 may transmit, in association with switching the first sensing state to the second sensing state, an indication that the sensing configuration has been paused.

The transmission component 1104 may transmit an indication of the one or more criteria.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
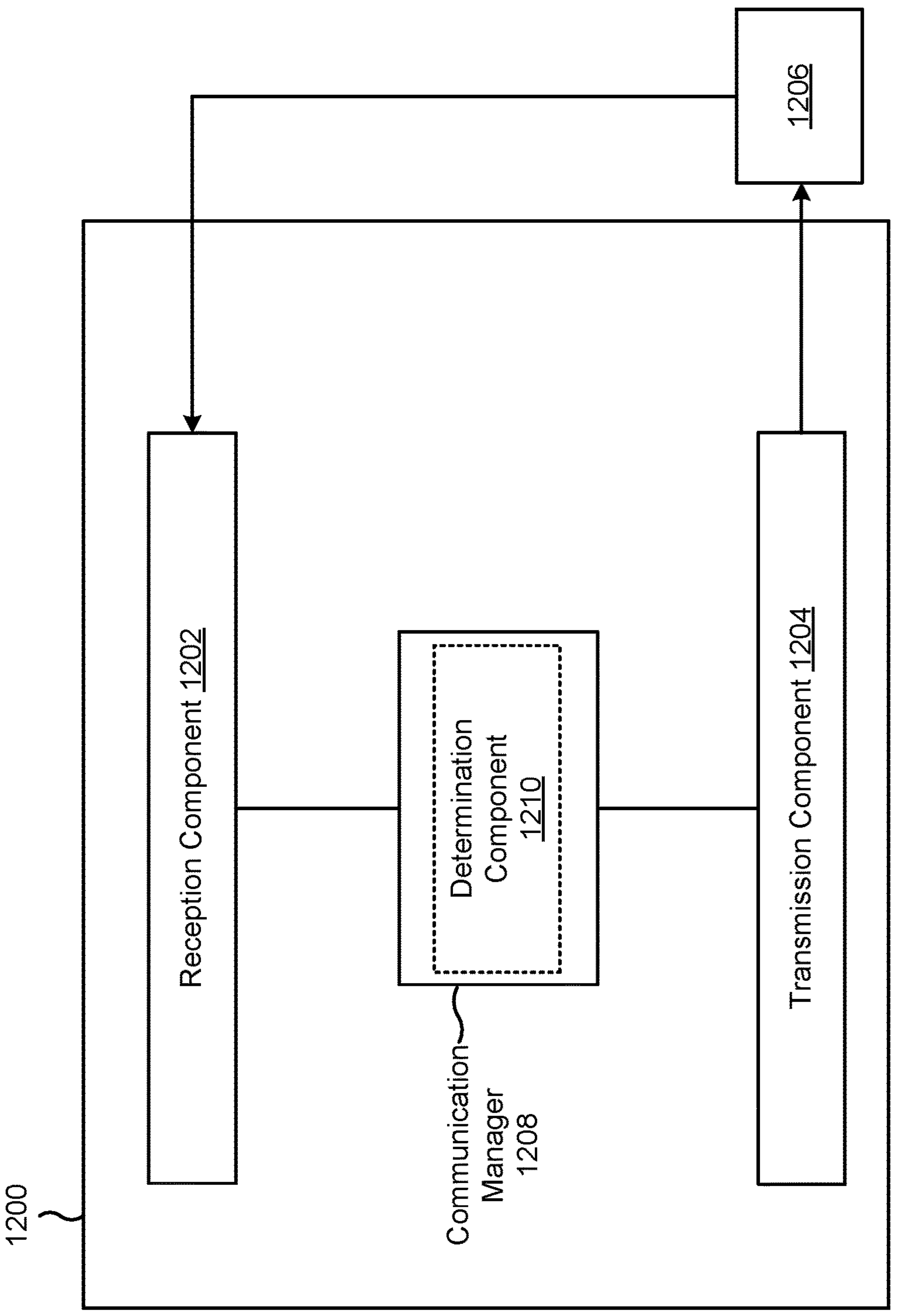
FIG. 12 is a diagram of an example apparatus for wireless communication that supports sensing service adaptive reconfiguration in accordance with the present disclosure.

FIG. 12 is a diagram of an example apparatus 1200 for wireless communication that supports sensing service adaptive reconfiguration in accordance with the present disclosure. The apparatus 1200 may be a SnMF entity, or a SnMF entity may include the apparatus 1200. The SnMF entity may be a network function entity and/or the network node 170 In some aspects, the apparatus 1200 includes a reception component 1202, a transmission component 1204, and a communication manager 1208, which may be in communication with one another (for example, via one or more buses). The communication manager 1208 may be, or may be similar to, other communication managers described herein, such as the communication manager 180. As shown, the apparatus 1200 may communicate with another apparatus 1206 (such as a UE, a network node, or another wireless communication device) using the reception component 1202 and the transmission component 1204.

In some aspects, the apparatus 1200 may be configured to and/or operable to perform one or more operations described herein in connection with FIG. 8. Additionally or alternatively, the apparatus 1200 may be configured to and/or operable to perform one or more processes described herein, such as process 1000 of FIG. 10. In some aspects, the apparatus 1200 may include one or more components of the network node described above in connection with FIG. 2.

The reception component 1202 may receive communications, such as reference signals, control information, and/or data communications, from the apparatus 1206. The reception component 1202 may provide received communications to one or more other components of the apparatus 1200, such as the communication manager 1208. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, one or more modems, one or more demodulators, one or more MIMO detectors, one or more receive processors, one or more controllers/processors, and/or one or more memories of the network node described above in connection with FIG. 2.

The transmission component 1204 may transmit communications, such as reference signals, control information, and/or data communications, to the apparatus 1206. In some aspects, the communication manager 1208 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, one or more modems, one or more modulators, one or more transmit MIMO processors, one or more transmit processors, one or more controllers/processors, and/or one or more memories of the network node described above in connection with FIG. 2. In some aspects, the transmission component 1204 may be co-located with the reception component 1202 in one or more transceivers.

The communication manager 1208 may receive or may cause the reception component 1202 to receive information for an SU associated with a sensing service, the information being indicative of whether an event satisfies one or more criteria. The communication manager 1208 may transmit or may cause the transmission component 1204 to transmit, to the SU and in association with the information indicating that the event satisfies the one or more criteria, an indication to modify at least one of a sensing state or a sensing configuration of the SU. In some aspects, the communication manager 1208 may perform one or more operations described elsewhere herein as being performed by one or more components of the communication manager 1208.

The communication manager 1208 may include one or more controllers/processors, one or more memories, one or more schedulers, and/or one or more communication units of the network node described above in connection with FIG. 2. In some aspects, the communication manager 1208 includes a set of components, such as a determination component 1210. Alternatively, the set of components may be separate and distinct from the communication manager 1208. In some aspects, one or more components of the set of components may include or may be implemented within one or more controllers/processors, one or more memories, one or more schedulers, and/or one or more communication units of the network node described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive information for an SU associated with a sensing service, the information being indicative of whether an event satisfies one or more criteria. The transmission component 1204 may transmit, to the SU and in association with the information indicating that the event satisfies the one or more criteria, an indication to modify at least one of a sensing state or a sensing configuration of the SU.

The determination component 1210 may determine to modify at least one of a sensing state or a sensing configuration of the SU in association with the information indicating that the event satisfies the one or more criteria.

The transmission component 1204 may transmit configuration information for the one or more RRM measurements indicating one or more reference signal configurations for the one or more RRM measurements.

The transmission component 1204 may transmit configuration information for a reference signal configuration for one or more reference signals and a reporting configuration for the first measurement report.

The reception component 1202 may receive a second measurement report indicating one or more RRM measurements.

The reception component 1202 may receive an indication that the SU has paused the sensing configuration.

The reception component 1202 may receive an indication of the one or more criteria.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a sensing unit (SU), comprising: performing, in accordance with operating according to a first sensing state, a first set of one or more operations associated with a sensing service; obtaining, in association with an event satisfying one or more criteria, an indication to switch from operating according to the first sensing state to operating according to a second sensing state, the switch of the first sensing state to the second sensing state being associated with a modification of a sensing configuration for the SU associated with the sensing service; and performing, in accordance with operating according to the second sensing state, a second set of one or more operations associated with the sensing service.

Aspect 2: The method of Aspect 1, wherein the first sensing state is a non-registered state or a non-configured state, wherein the second sensing state is a configured state associated with the sensing configuration being configured for the SU, and wherein performing the first set of one or more operations comprises: transmitting a measurement report indicating one or more radio resource management (RRM) measurements, wherein the event satisfying the one or more criteria includes the one or more RRM measurements satisfying a threshold.

Aspect 3: The method of Aspect 2, wherein obtaining the indication to switch the first sensing state to the second sensing state comprises receiving configuration information indicating the sensing configuration.

Aspect 4: The method of any of Aspects 2-3, further comprising receiving configuration information for the one or more RRM measurements indicating one or more reference signal configurations for the one or more RRM measurements.

Aspect 5: The method of any of Aspects 1-4, wherein the first sensing state is a configured state associated with the sensing configuration being configured for the SU, wherein the second sensing state is a non-configured state, and wherein performing the first set of one or more operations comprises: transmitting a first measurement report indicating one or more measurements of one or more reference signals associated with the sensing service, wherein the event satisfying the one or more criteria includes the one or more measurements not satisfying a first threshold.

Aspect 6: The method of Aspect 5, further comprising: receiving configuration information for a reference signal configuration for one or more reference signals and a reporting configuration for the first measurement report.

Aspect 7: The method of any of Aspects 5-6, wherein the one or more reference signals include at least one of: one or more radio resource management (RRM) reference signals, or one or more sensing reference signals.

Aspect 8: The method of any of Aspects 5-7, wherein the one or more measurements indicate a position of the SU, and wherein the event satisfying the one or more criteria includes a distance between the position of the SU and a sensing area or a sensing target of the sensing configuration satisfying a distance threshold.

Aspect 9: The method of any of Aspects 5-8, wherein obtaining the indication to switch the first sensing state to the second sensing state comprises obtaining an indication to de-configure or pause the sensing configuration.

Aspect 10: The method of any of Aspects 5-9, wherein performing the second set of one or more operations comprises: transmitting a second measurement report indicating one or more radio resource management (RRM) measurements.

Aspect 11: The method of Aspect 10, further comprising: receiving an indication to switch the second sensing state to the first sensing state in association with the one or more RRM measurements satisfying a second threshold; and performing, in accordance with the second sensing state, a third one or more operations for the sensing configuration or another sensing configuration.

Aspect 12: The method of any of Aspects 5-11, further comprising: refraining from performing a third one or more operations for the sensing configuration; and transmitting, in association with switching the first sensing state to the second sensing state, an indication that the sensing configuration has been paused.

Aspect 13: The method of any of Aspects 1-12, wherein the event is associated with one or more processing outputs of the sensing configuration.

Aspect 14: The method of Aspect 13, wherein the one or more processing outputs include at least one of: one or more Doppler measurements, one or more sensor detections, a distance to a sensing target, an angle between the SU and the sensing target, or a radar cross section of the sensing target.

Aspect 15: The method of any of Aspects 1-14, wherein the event is associated with one or more configurations of the SU.

Aspect 16: The method of Aspect 15, wherein the one or more configurations include at least one of: an antenna configuration, a transmit power configuration, a bandwidth configuration, a frequency configuration, or a network load.

Aspect 17: The method of any of Aspects 15-16, wherein the event satisfying the one or more criteria includes a change in the one or more configurations, the method further comprising: transmitting an indication of the change in the one or more configurations.

Aspect 18: The method of any of Aspects 1-17, further comprising: transmitting an indication of the one or more criteria.

Aspect 19: The method of Aspect 18, wherein the one or more criteria include at least one of: a battery level of the SU, a location of the SU, or a processing capacity of the SU.

Aspect 20: The method of any of Aspects 1-19, wherein the event is associated with one or more radio resource management (RRM) measurements.

Aspect 21: The method of any of Aspects 1-20, wherein the event is associated with one or more sensing reference signal measurements.

Aspect 22: The method of any of Aspects 1-21, wherein the event is associated with a distance between the SU and a network node or between the SU and a sensing target of the sensing configuration.

Aspect 23: The method of any of Aspects 1-22, wherein the event is associated with a sensing parameter of a sensing target of the sensing configuration.

Aspect 24: The method of any of Aspects 1-23, wherein the event is associated with at least one of: a handover of the SU, a change in a sensing area of the sensing configuration, or a change in a service area of the SU.

Aspect 25: The method of any of Aspects 1-24, wherein the event is associated with a change in a capability of the SU.

Aspect 26: The method of any of Aspects 1-25, wherein the event is associated with a change in one or more network condition parameters.

Aspect 27: The method of any of Aspects 1-26, wherein the event is associated with a change in one or more parameters of the sensing service.

Aspect 28: A method of wireless communication performed by a sensing management function entity, comprising: receiving information for a sensing unit (SU) associated with a sensing service, the information being indicative of whether an event satisfies one or more criteria; and transmitting, to the SU and in association with the information indicating that the event satisfies the one or more criteria, an indication to modify at least one of a sensing state or a sensing configuration of the SU.

Aspect 29: The method of Aspect 28, wherein the sensing state is a non-registered state or a non-configured state, and the method further comprising: receiving a measurement report indicating one or more radio resource management (RRM) measurements, wherein the event satisfying the one or more criteria includes the one or more RRM measurements satisfying a threshold.

Aspect 30: The method of Aspect 29, wherein transmitting the indication to modify at least one of the sensing state or the sensing configuration of the SU comprises transmitting configuration information indicating the sensing configuration.

Aspect 31: The method of any of Aspects 29-30, further comprising transmitting configuration information for the one or more RRM measurements indicating one or more reference signal configurations for the one or more RRM measurements.

Aspect 32: The method of any of Aspects 28-31, wherein the sensing state is a configured state associated with the sensing configuration being configured for the SU, wherein the indication to modify at least one of the sensing state or the sensing configuration of the SU indicates that the sensing state is to be switched to a non-configured state, and the method further comprising: receiving a first measurement report indicating one or more measurements of one or more reference signals associated with the sensing service, wherein the event satisfying the one or more criteria includes the one or more measurements not satisfying a first threshold.

Aspect 33: The method of Aspect 32, further comprising: transmitting configuration information for a reference signal configuration for one or more reference signals and a reporting configuration for the first measurement report.

Aspect 34: The method of any of Aspects 32-33, wherein the one or more reference signals include at least one of: one or more radio resource management (RRM) reference signals, or one or more sensing reference signals.

Aspect 35: The method of any of Aspects 32-34, wherein the one or more measurements indicate a position of the SU, and wherein the event satisfying the one or more criteria includes a distance between the position of the SU and a sensing area or a sensing target of the sensing configuration satisfying a distance threshold.

Aspect 36: The method of any of Aspects 32-35, wherein transmitting the indication to modify at least one of the sensing state or the sensing configuration of the SU comprises receiving an indication to de-configure or pause the sensing configuration.

Aspect 37: The method of any of Aspects 32-36, further comprising: receiving a second measurement report indicating one or more radio resource management (RRM) measurements.

Aspect 38: The method of Aspect 37, wherein transmitting the indication to modify at least one of the sensing state or the sensing configuration of the SU comprises: transmitting an indication to switch the sensing state back to the configured state in association with the one or more RRM measurements satisfying a second threshold.

Aspect 39: The method of any of Aspects 32-38, further comprising: receiving an indication that the SU has paused the sensing configuration.

Aspect 40: The method of any of Aspects 28-39, wherein the event is associated with one or more processing outputs of the sensing configuration.

Aspect 41: The method of Aspect 40, wherein the one or more processing outputs include at least one of: one or more Doppler measurements, one or more sensor detections, a distance to a sensing target, an angle between the SU and the sensing target, or a radar cross section of the sensing target.

Aspect 42: The method of any of Aspects 28-41, wherein the event is associated with one or more configurations of the SU.

Aspect 43: The method of Aspect 42, wherein the one or more configurations include at least one of: an antenna configuration, a transmit power configuration, a bandwidth configuration, a frequency configuration, or a network load.

Aspect 44: The method of any of Aspects 42-43, wherein the event satisfying the one or more criteria includes a change in the one or more configurations, the method further comprising: receiving an indication of the change in the one or more configurations.

Aspect 45: The method of any of Aspects 28-44, further comprising: receiving an indication of the one or more criteria.

Aspect 46: The method of Aspect 45, wherein the one or more criteria include at least one of: a battery level of the SU, a location of the SU, or a processing capacity of the SU.

Aspect 47: The method of any of Aspects 28-46, wherein the event is associated with one or more radio resource management (RRM) measurements.

Aspect 48: The method of any of Aspects 28-47, wherein the event is associated with one or more sensing reference signal measurements.

Aspect 49: The method of any of Aspects 28-48, wherein the event is associated with a distance between the SU and a network node or between the SU and a sensing target of the sensing configuration.

Aspect 50: The method of any of Aspects 28-49, wherein the event is associated with a sensing parameter of a sensing target of the sensing configuration.

Aspect 51: The method of any of Aspects 28-50, wherein the event is associated with at least one of: a handover of the SU, a change in a sensing area of the sensing configuration, or a change in a service area of the SU.

Aspect 52: The method of any of Aspects 28-51, wherein the event is associated with a change in a capability of the SU.

Aspect 53: The method of any of Aspects 28-52, wherein the event is associated with a change in one or more network condition parameters.

Aspect 54: The method of any of Aspects 28-53, wherein the event is associated with a change in one or more parameters of the sensing service.

Aspect 55: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-54.

Aspect 56: An apparatus for wireless communication at a device, the apparatus comprising one or more memories and one or more processors coupled to the one or more memories, the one or more processors configured to cause the device to perform the method of one or more of Aspects 1-54.

Aspect 57: An apparatus for wireless communication, the apparatus comprising at least one means for performing the method of one or more of Aspects 1-54.

Aspect 58: A non-transitory computer-readable medium storing code for wireless communication, the code comprising instructions executable by one or more processors to perform the method of one or more of Aspects 1-54.

Aspect 59: A non-transitory computer-readable medium storing a set of instructions for wireless communication, the set of instructions comprising one or more instructions that, when executed by one or more processors of a device, cause the device to perform the method of one or more of Aspects 1-54.

Aspect 60: A device for wireless communication, the device comprising a processing system that includes one or more processors and one or more memories coupled with the one or more processors, the processing system configured to cause the device to perform the method of one or more of Aspects 1-54.

Aspect 61: An apparatus for wireless communication at a device, the apparatus comprising one or more memories and one or more processors coupled to the one or more memories, the one or more processors individually or collectively configured to cause the device to perform the method of one or more of Aspects 1-54.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A sensing unit (SU) for wireless communication, comprising:

one or more antennas; and a processing system, coupled with the one or more antennas, that includes one or more processors and one or more memories that store code for the one or more processors, the processing system configured to cause the SU to:

perform, in accordance with operating according to a first sensing state, a first set of one or more operations associated with a sensing service;

receive, from a sensing management function entity, in response to an event satisfying one or more criteria, an indication to switch from operating according to the first sensing state to operating according to a second sensing state, the switch from the first sensing state to the second sensing state being associated with a modification of a sensing configuration for the SU associated with the sensing service, wherein the one or more criteria includes one or more of a change in a Doppler measurement of a target object or a change in a radar cross section (RCS) of the target object; and perform, in accordance with operating according to the second sensing state, a second set of one or more operations associated with the sensing service.

2. The SU of claim 1, wherein the first sensing state is a non-registered state or a non-configured state, wherein the second sensing state is a configured state associated with the sensing configuration being configured for the SU, and wherein the processing system, to cause the SU to perform the first set of one or more operations, is configured to cause the SU to:

transmit a measurement report indicating one or more radio resource management (RRM) measurements, wherein the event satisfying the one or more criteria includes the one or more RRM measurements satisfying a threshold.

3. The SU of claim 2, wherein, to cause the SU to obtain the indication to switch the first sensing state to the second sensing state, the processing system is configured to cause the SU to receive configuration information indicating the sensing configuration.

4. The SU of claim 1, wherein the first sensing state is a configured state associated with the sensing configuration being configured for the SU, wherein the second sensing state is a non-configured state, and wherein the processing system, to cause the SU to perform the first set of one or more operations, is configured to cause the SU to:

transmit a first measurement report indicating one or more measurements of one or more reference signals associated with the sensing service, wherein the event satisfying the one or more criteria includes the one or more measurements not satisfying a first threshold.

5. The SU of claim 4, wherein the processing system is further configured to cause the SU to:

receive configuration information for a reference signal configuration for one or more reference signals and a reporting configuration for the first measurement report.

6. The SU of claim 4, wherein the one or more measurements indicate a position of the SU, and wherein the event satisfying the one or more criteria includes a distance between the position of the SU and a sensing area or a sensing target of the sensing configuration satisfying a distance threshold.

7. The SU of claim 4, wherein, to cause the SU to perform the second set of one or more operations, the processing system is configured to cause the SU to:

transmit a second measurement report indicating one or more radio resource management (RRM) measurements.

8. The SU of claim 7, wherein the processing system is further configured to cause the SU to:

receive an indication to switch the second sensing state to the first sensing state in association with the one or more RRM measurements satisfying a second threshold; and perform, in accordance with the second sensing state, a third set of one or more operations for the sensing configuration or another sensing configuration.

9. The SU of claim 4, wherein the processing system is further configured to cause the SU to:

refrain from performing a third set of one or more operations for the sensing configuration; and transmit, in association with switching the first sensing state to the second sensing state, an indication that the sensing configuration has been paused.

10. The SU of claim 1, wherein the event is associated with one or more processing outputs of the sensing configuration.

11. A sensing management function entity for wireless communication, comprising:

one or more antennas; and a processing system, coupled to the one or more antennas, that includes one or more processors and one or more memories that store code for the one or more processors, the processing system configured to cause the sensing management function entity to:

receive information for a sensing unit (SU) associated with a sensing service, the information being indicative of whether an event satisfies one or more criteria; and transmit, to the SU and in response to the information indicating that the event satisfies the one or more criteria, an indication to modify at least one of a sensing state or a sensing configuration of the SU, wherein the one or more criteria includes one or more of a change in a Doppler measurement of a target object or a change in a radar cross section (RCS) of the target object.

12. The sensing management function entity of claim 11, wherein the sensing state is a non-registered state or a non-configured state, and wherein the processing system is further configured to cause the sensing management function entity to:

receive a measurement report indicating one or more radio resource management (RRM) measurements, wherein the event satisfying the one or more criteria includes the one or more RRM measurements satisfying a threshold.

13. The sensing management function entity of claim 12, wherein, to cause the sensing management function entity to transmit the indication to modify at least one of the sensing state or the sensing configuration of the SU, the processing system is configured to cause the sensing management function entity to transmit configuration information indicating the sensing configuration.

14. The sensing management function entity of claim 12, wherein the processing system is further configured to cause the sensing management function entity to transmit configuration information for the one or more RRM measurements indicating one or more reference signal configurations for the one or more RRM measurements.

15. The sensing management function entity of claim 11, wherein the sensing state is a configured state associated with the sensing configuration being configured for the SU, wherein the indication to modify at least one of the sensing state or the sensing configuration of the SU indicates that the sensing state is to be switched to a non-configured state, and wherein the processing system is further configured to cause the sensing management function entity to:

receive a first measurement report indicating one or more measurements of one or more reference signals associated with the sensing service, wherein the event satisfying the one or more criteria includes the one or more measurements not satisfying a first threshold.

16. The sensing management function entity of claim 15, wherein the processing system is further configured to cause the sensing management function entity to:

transmit configuration information for a reference signal configuration for one or more reference signals and a reporting configuration for the first measurement report.

17. The sensing management function entity of claim 15, wherein the one or more reference signals include at least one of:

one or more radio resource management (RRM) reference signals, or one or more sensing reference signals.

18. The sensing management function entity of claim 11, wherein the event is associated with at least one of:

a handover of the SU, a change in a sensing area of the sensing configuration, or a change in a service area of the SU.

19. The sensing management function entity of claim 11, wherein the event is associated with a change in at least one of:

a capability of the SU, one or more network condition parameters, or one or more parameters of the sensing service.

20. A method of wireless communication by a sensing unit (SU), comprising:

performing, in accordance with operating according to a first sensing state, a first set of one or more operations associated with a sensing service;

receiving, from a sensing management function entity, in response to an event satisfying one or more criteria, an indication to switch from operating according to the first sensing state to operating according to a second sensing state, the switch from the first sensing state to the second sensing state being associated with a modification of a sensing configuration for the SU associated with the sensing service, wherein the one or more criteria includes one or more of a change in a Doppler measurement of a target object or a change in a radar cross section (RCS) of the target object; and performing, in accordance with operating according to the second sensing state, a second set of one or more operations associated with the sensing service.

21. The method of claim 20, wherein the first sensing state is a non-registered state or a non-configured state, wherein the second sensing state is a configured state associated with the sensing configuration being configured for the SU, and wherein performing the first set of one or more operations comprises:

transmitting a measurement report indicating one or more radio resource management (RRM) measurements, wherein the event satisfying the one or more criteria includes the one or more RRM measurements satisfying a threshold.

22. The method of claim 20, wherein the first sensing state is a configured state associated with the sensing configuration being configured for the SU, wherein the second sensing state is a non-configured state, and wherein performing the first set of one or more operations comprises:

transmitting a first measurement report indicating one or more measurements of one or more reference signals associated with the sensing service, wherein the event satisfying the one or more criteria includes the one or more measurements not satisfying a first threshold.

23. The method of claim 20, further comprising:

transmitting an indication of the one or more criteria.

24. The method of claim 23, wherein the one or more criteria include at least one of:

a battery level of the SU, a location of the SU, or a processing capacity of the SU.

25. The method of claim 20, wherein the event is associated with at least one of:

one or more radio resource management (RRM) measurements, one or more sensing reference signal measurements, a distance between the SU and a network node or between the SU and a sensing target of the sensing configuration, or a sensing parameter of a sensing target of the sensing configuration.

26. A method of wireless communication by a sensing management function entity, comprising:

receiving information for a sensing unit (SU) associated with a sensing service, the information being indicative of whether an event satisfies one or more criteria; and transmitting, to the SU and in response to the information indicating that the event satisfies the one or more criteria, an indication to modify at least one of a sensing state or a sensing configuration of the SU, wherein the one or more criteria includes one or more of a change in a Doppler measurement of a target object or a change in a radar cross section (RCS) of the target object.

27. The method of claim 26, wherein the sensing state is a non-registered state or a non-configured state, and the method further comprising:

receiving a measurement report indicating one or more radio resource management (RRM) measurements, wherein the event satisfying the one or more criteria includes the one or more RRM measurements satisfying a threshold.

28. The method of claim 27, wherein transmitting the indication to modify at least one of the sensing state or the sensing configuration of the SU comprises transmitting configuration information indicating the sensing configuration.

29. The method of claim 28, further comprising transmitting configuration information for the one or more RRM measurements indicating one or more reference signal configurations for the one or more RRM measurements.

30. The method of claim 26, wherein the sensing state is a configured state associated with the sensing configuration being configured for the SU, wherein the indication to modify at least one of the sensing state or the sensing configuration of the SU indicates that the sensing state is to be switched to a non-configured state, and the method further comprising:

receiving a first measurement report indicating one or more measurements of one or more reference signals associated with the sensing service, wherein the event satisfying the one or more criteria includes the one or more measurements not satisfying a first threshold.

* * * * *